(12) United States Patent
Hatanaka et al.

(10) Patent No.: US 8,776,136 B2
(45) Date of Patent: Jul. 8, 2014

(54) INFORMATION PROCESSING SYSTEM, RECORDING APPARATUS, COMMUNICATION APPARATUS, INFORMATION PROCESSING METHOD, AND PROGRAM

(75) Inventors: Kentaro Hatanaka, Tokyo (JP); Eiju Yamada, Kanagawa (JP); Masayuki Ishikawa, Chiba (JP); Takashi Nomura, Tokyo (JP); Takashi Miura, Kanagawa (JP); Tsuyoshi Oobayashi, Tokyo (JP)

(73) Assignee: Sony Corporation (JP)

( * ) Notice: Subject to any disclaimer, the term of this patent is extended or adjusted under 35 U.S.C. 154(b) by 1169 days.

(21) Appl. No.: 11/203,945

(22) Filed: Aug. 15, 2005

(65) Prior Publication Data
US 2006/0041910 A1 Feb. 23, 2006

(30) Foreign Application Priority Data

Aug. 16, 2004 (JP) .............................. P2004-236729

(51) Int. Cl.
*H04N 5/445* (2011.01)
(52) U.S. Cl.
USPC .............................................. 725/58; 725/39
(58) Field of Classification Search
CPC ................ H04N 21/4135; H04N 21/43622
USPC ................................................ 725/58, 133, 39
See application file for complete search history.

(56) References Cited

U.S. PATENT DOCUMENTS

| 2002/0168177 | A1 | 11/2002 | Kajitani | |
|---|---|---|---|---|
| 2003/0023987 | A1 * | 1/2003 | Hiramoto et al. | 725/141 |
| 2003/0050062 | A1 * | 3/2003 | Chen et al. | 455/435 |

FOREIGN PATENT DOCUMENTS

| EP | 1 411 718 A1 | 4/2004 | |
|---|---|---|---|
| EP | 1411718 A1 * | 4/2004 | ............... H04N 5/44 |
| JP | 09-102827 A | 4/1997 | |
| JP | 2000-013697 A | 1/2000 | |
| JP | 2000-354221 A | 12/2000 | |
| JP | 2001-309285 A | 11/2001 | |
| JP | 2001346270 A | 12/2001 | |
| JP | 2002-158951 A | 5/2002 | |
| JP | 2002251356 A | 9/2002 | |
| JP | 2003-069927 A | 3/2003 | |

(Continued)

OTHER PUBLICATIONS

Office Action from Japanese Application No. 2004-236729, dated Dec. 1, 2011.

(Continued)

*Primary Examiner* — Nasser Goodarzi
*Assistant Examiner* — Hyun Hong
(74) *Attorney, Agent, or Firm* — Lerner, David, Littenberg, Krumholz & Mentlik, LLP

(57) ABSTRACT

In a DVR recording apparatus, a program and EPG data are received, and the EPG data and a reservation list, which relates to a reservation status of program recording, are stored. In addition, reserved recording, for recording a program in accordance with the reservation list, is carried out. Further, in the DVR, EPG data or the reservation list is transmitted in accordance with a request from a portable telephone. On one hand, in the portable telephone, in accordance with an operation of a user, a request of the EPG data or reservation list is transmitted, and in accordance with the request, the EPG data or reservation list transmitted from the DVR is received. Then, the EPG data or reservation list is presented in the portable telephone to a user.

20 Claims, 12 Drawing Sheets

(56) References Cited

FOREIGN PATENT DOCUMENTS

| | | |
|---|---|---|
| JP | 2003-069928 A | 3/2003 |
| JP | 2003-078851 A | 3/2003 |
| JP | 2003-230081 A | 8/2003 |
| JP | 2004207806 A | 7/2004 |
| WO | WO-03/088655 A1 | 10/2003 |

OTHER PUBLICATIONS

Office Action from Japanese Application No. 2004-236729, dated Jan. 13, 2011.
Office Action from Japanese Application No. 2008-236479, dated Jan. 24, 2012.

* cited by examiner

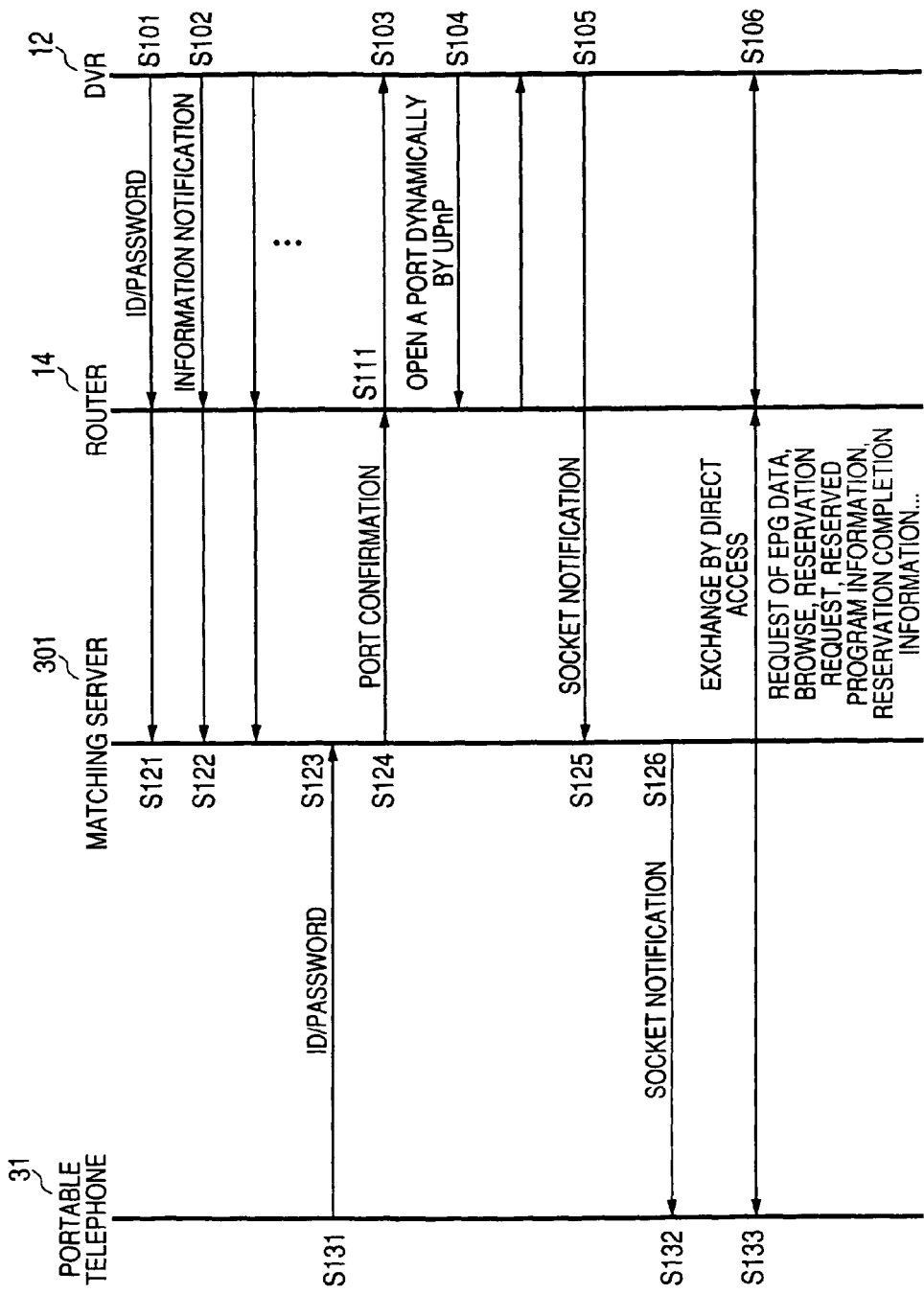

INFORMATION PROCESSING SYSTEM, RECORDING APPARATUS, COMMUNICATION APPARATUS, INFORMATION PROCESSING METHOD, AND PROGRAM

CROSS-REFERENCE TO RELATED APPLICATIONS

The present application claims priority from Japanese Application No. 2004-236729 filed Aug. 16, 2004, the disclosure of which is hereby incorporated by reference herein.

BACKGROUND OF THE INVENTION

This invention relates to an information processing system, a recording apparatus, a communication apparatus, an information processing method, and a program, and in particular, relates to an information processing system, a recording apparatus, a communication apparatus, an information processing method, and a program, which enable to provide a convenient recording apparatus by effectively utilizing EPG (Electronic Program Guide) data and other information which are possessed by a recording apparatus such as a hard disk recorder.

In late years, DVR (Digital Video Recorder) such as a hard disk recorder, and a hybrid recorder of a hard disk and DVD (Digital Versatile Disc) has been getting popular rapidly. Further, on Internet, an EPG server, which is a server for providing a web page of EPG, called as iEPG, is about to become popular. As the suchlike EPG server, there is not only one for providing a web page for the purpose of browsing EPG but also one for providing a service for controlling recording reservation of a program (e.g., see, JP-A-2001-309285 publication).

That is, in the EPG server which provides a service for controlling recording reservation of a program, for example, when a user accesses to it from a place where one is away from home, through the use of a portable telephone, a web page of EPG is provided to the portable telephone of the user. When the user takes a look at the web page and operates the portable telephone so as to make a recording reservation of a desired program, program information relating to the program, such as a channel (its number or a broadcast station name etc.,), a broadcast date, broadcast starting time, broadcast ending time, a tile, and description of a program content of the program which became an object for the recording reservation, is stored in the EPG server, in association with, for example, user information which specifies the user who is an owner of the portable telephone.

On one hand, for example, in case that DVR, which is installed in a house of a user (user home), is executing polling to the EPG server, and the EPG server stores program information which was associated with user information of a user of a portable telephone, the program information is transmitted to DVR in accordance with the polling from DVR.

DVR receives the program information from the EPG server, and when time, which is represented by broadcast starting time in the program information, comes, recording of a program of a channel in the program information is started.

As above, in the past, in order for a user to browse EPG from a place where one is away from home, there was need to access to an EPG server through the use of a portable telephone and to receive provision of a web page of EPG from the EPG server.

Therefore, there was need to install the suchlike EPG server, and further, in case that the number of accesses to the EPG server was increased, there was need to realize reinforcing of the EPG server.

In addition, in the EPG server, there is need to arbitrarily update EPG which is provided as a web page, but in case that its update is slow, it means that a user can not browse the latest EPG.

Further, for example, in case that a family operates directly DVR which is installed in a user home and thereby, a recording reservation of a program, which is identical to a program for which a user is about to make a recording reservation, has been already made, there is no need for a user to make the recording reservation. However, a user, who goes out from home, does not know that the recording reservation has been already made, and therefore, there is such fear that a user operates a portable telephone to make a so-called useless recording reservation.

On one hand, in terrestrial analog broadcasting, data of EPG (EPG data) is overlapped with broadcast waves and transmitted, and DVR, which receives, stores and displays the EPG data, is manufactured and sold. Here, EPG data includes, for example, program information of each program (a channel, broadcast data, broadcast starting time, broadcast ending time, a title, description of a program content).

In addition, also in terrestrial digital broadcasting, EPG data is transmitted, and as DVR which corresponds to digital broadcasting, DVR, which can handle EPG data by the digital broadcasting, is about to appear on the scene.

Then, in the digital broadcasting, as compared to the analog broadcasting, it is possible to transmit EPG data more quickly, and therefore, in DVR, it becomes possible to quickly obtain the latest EPG data. In this case, in DVR, the latest EPG data is stored, but in an EPG server, there can occur such a situation that it is not possible to provide the latest EPG, since it is during a period for updating a web page of EPG.

Therefore, as described above, in case that it becomes possible in DVR to quickly obtain EPG data, it is possible for a user to browse the latest EPG, in case that EPG is provided from DVR which is installed in a user's own house, rather than such a case that EPG is provided from an EPG server.

Further, DVR stores information of a recording reservation which has been already made, and if it is possible in a portable telephone to obtain information of a recording reservation from DVR and confirm it, it is not necessary for a user to make the useless recording reservation as described above.

SUMMARY OF THE INVENTION

The invention is one which enables to provide a convenient recording apparatus by effectively utilizing information which is possessed by a recording apparatus such as DVR.

An information processing system of the invention is characterized in that a recording apparatus has a receiving unit which receives a program and EPG data, a storing unit which stores the EPG data and reservation status information which relates to a reservation status of program recording, a reservation recording processing unit which carries out reservation recording processing in which a program is recorded in accordance with the reservation status information, and a first communication unit which communicates with the communication apparatus and transmits the EPG data or the reservation status information in accordance with a request from the communication apparatus, and a communication apparatus has a second communication unit which communicates with the recording apparatus and transmits a request of the EPG data or the reservation status information in accordance with an operation of a user, and receives the EPG data or the reservation status information which is transmitted from the recording apparatus, in accordance with the request, and a presenting unit which presents the EPG data or the reservation status information which was received by the second communication unit.

A recording apparatus of the invention is characterized by having a receiving unit which receives a program and EPG data, a storing unit which stores the EPG data and reservation status information which relates to a reservation status of program recording, a reservation recording processing unit which carries out reservation recording processing for recording a program in accordance with the reservation status information, and a communication unit which communicates with an external communication apparatus and transmits the EPG data or the reservation status information, in accordance with a request from the communication apparatus.

A first information processing method of the invention is characterized by including a receiving step of receiving a program and EPG data, a storing step of storing the EPG data and reservation status information which relates to a reservation status of program recording, a reservation recording processing step of carrying out reservation recording processing for recording a program in accordance with the reservation status information, and a communication step of communicating with an external communication apparatus, and transmitting the EPG data or the reservation status information in accordance with a request from the communication apparatus.

A first program of the invention is characterized by including a receiving step of controlling reception of a program and EPG data, a storing step of controlling storage of the EPG data and reservation status information which relates to a reservation status of program recording, a reservation recording processing step of controlling reservation recording processing for recording a program in accordance with the reservation status information, and a communication step of controlling communication with an external communication apparatus, and having the EPG data or the reservation status information transmitted, in accordance with a request from the communication apparatus.

A communication apparatus of the invention is characterized by having a communication unit which communicates with a recording apparatus, and transmits a request of EPG data or reservation status information in accordance with an operation of a user, and receives the EPG data or the reservation status information which is transmitted from the recording apparatus in accordance with the request, and a presenting unit which presents the EPG data or the reservation status information which was received by the communication unit.

A second information processing method of the invention is characterized by including a communication step of communicating with a recording apparatus, and transmitting a request of EPG data or reservation status information in accordance with an operation of a user, and receiving the EPG data or the reservation status information which is transmitted from the recording apparatus in accordance with the request, and a presenting step of presenting the EPG data or the reservation status information which was received in the communication step.

A second program of the invention is characterized by including a communication step of controlling communication with a recording apparatus, and transmitting a request of EPG data or reservation status information in accordance with an operation of a user, and receiving the EPG data or the reservation status information which is transmitted from the recording apparatus in accordance with the request, and a presenting step of presenting the EPG data or the reservation status information which was received in the communication step.

In the information processing system of the invention, a program and EPG data are received in the recording apparatus, whereas the EPG data and reservation status information, which relates to a reservation status of program recording, are stored therein. In addition, reservation recording processing for recording a program in accordance with the reservation status information is carried out. Further, in accordance with a request from the communication apparatus, the EPG data and the reservation status information are transmitted. On one hand, in the communication apparatus, in accordance with an operation of a user, a request of the EPG data or the reservation status information is transmitted, and in accordance with the request, the EPG data or the reservation status information, which is transmitted from the recording apparatus, is received. Then, the EPG data or the reservation status information is presented.

In the recording apparatus, the first information processing method, and the first program of the invention, a program and EPG data are received, whereas EPG data and reservation status information, which relates to a reservation status of program recording, are stored. In addition, in accordance with the reservation status information, program recording is carried out. Further, in accordance with a request from the communication apparatus, EPG data or the reservation status information is transmitted.

In the communication apparatus, the second information processing method, and the second program of the invention, in accordance with an operation of a user, a request of EPG data or reservation status information is transmitted, and in accordance with the request, the EPG data or the reservation status information, which is transmitted from the recording apparatus, is received. Then, the EPG data or the reservation status information is presented.

According to the invention, it becomes possible to effectively utilize information which is possessed by a recording apparatus.

BRIEF DESCRIPTION OF THE DRAWINGS

The invention, together with further advantages thereof, may be best be understood by reference to the following description taken in conduction with the accompanying drawings in which:

FIG. 13 is a view which explains operations (processing) of DVR 12, a router 14, a portable telephone 31, and a matching server 301.

DETAILED DESCRIPTION

Embodiments of the invention will be hereinafter described, and a corresponding relation of constituent elements described in the claims and concrete examples in the Detailed Description will be exemplified as follows. This description is used for confirming that concrete examples for supporting the inventions described in the claims are described in the Detailed Description. Therefore, even if there is a concrete example which is described in the Detailed Description but is not described here as one which corresponds to constituent elements, it does not mean that the concrete example is not one which corresponds to the constituent elements. Inversely, even if a concrete example is described here as one which corresponds to constituent elements, it does not mean that the concrete example is one which does not correspond to other constituent elements than the constituent elements.

Further, this description does not mean that inventions, which correspond to concrete examples described in the Detailed Description, are all described in the claims. In other words, this description is an invention which corresponds to a concrete example described in the Detailed Description, and is not one which denies existence of an invention which is not described in the claims of this application, i.e., existence of an invention which will be filed as a divisional application in the future, or added by amendment.

Figure 5:
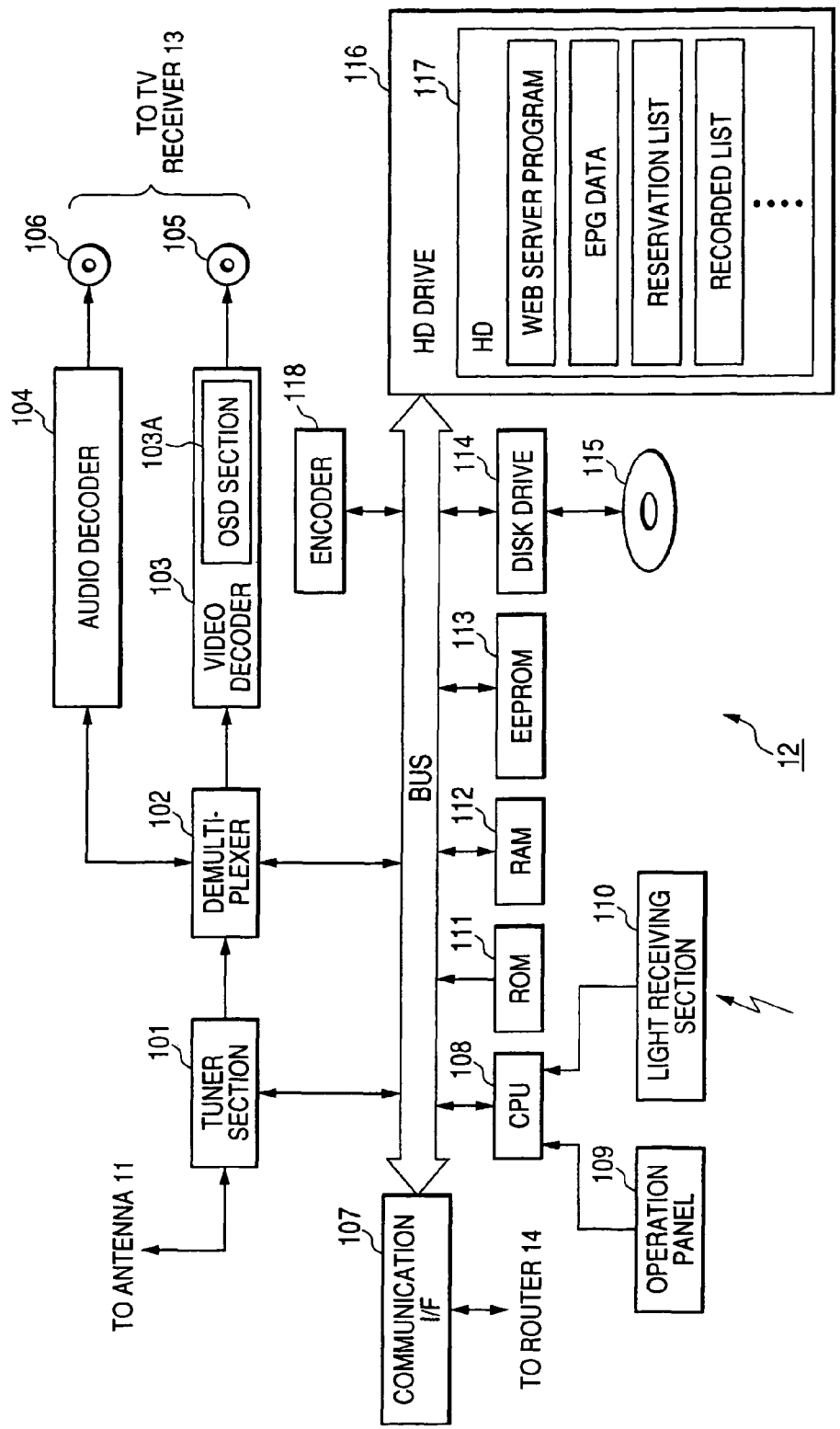
FIG. 5 is a block diagram which shows a configuration example of DVR 12.
Figure 6:
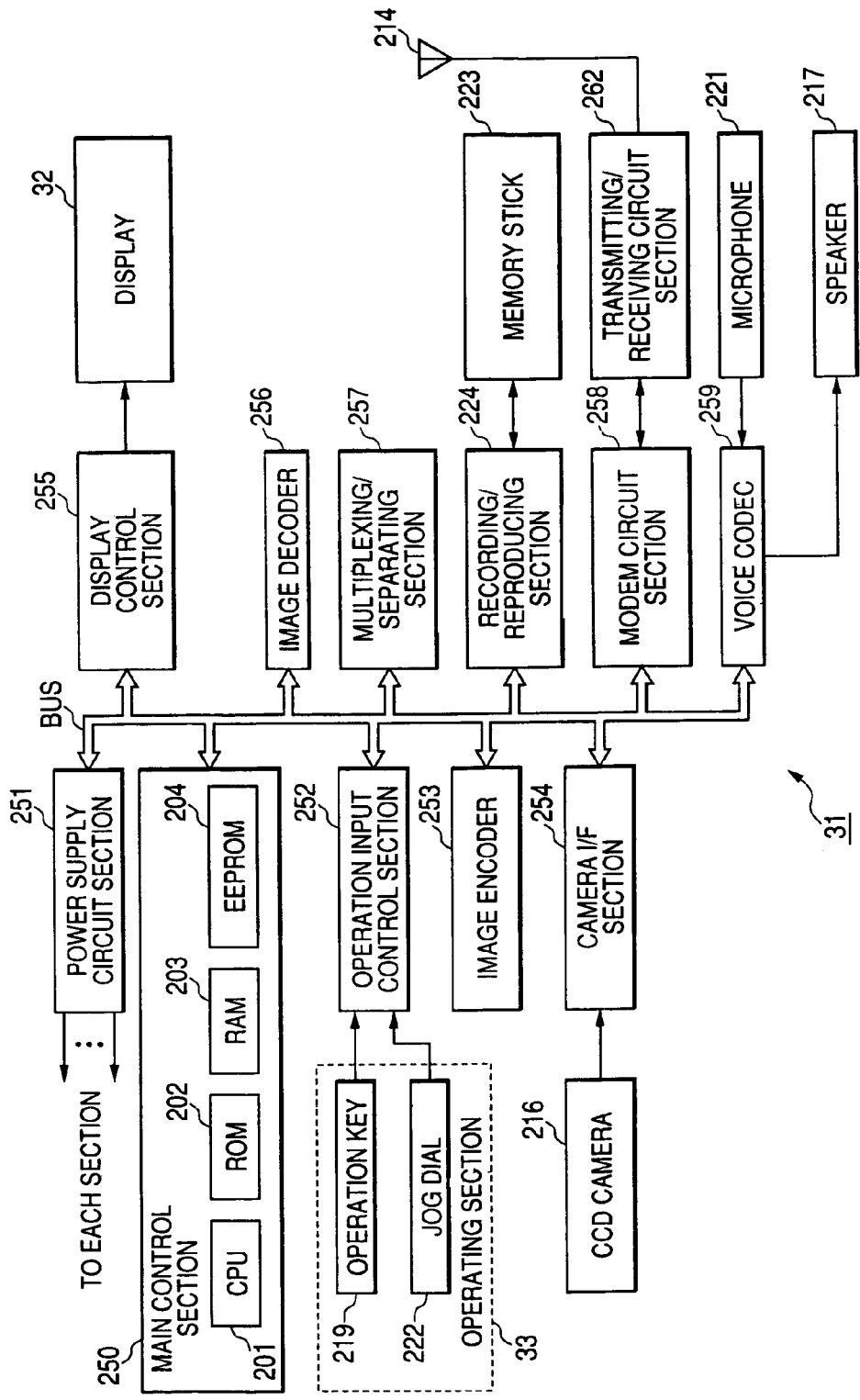
FIG. 6 is a block diagram which shows a configuration example of the portable telephone 31.

An information processing system (e.g., a recording reservation system of FIG.1) includes a recording apparatus (e.g., DVR 12 of FIG.1) receives and records a program and a communication apparatus (e.g., a portable telephone 31 of FIG.1) which communicates with the recording apparatus, and in which the recording apparatus has a receiving unit (e.g., a tuner section 101 of FIG.5) which receives a program and EPG (Electronic Program Guide) data, a storing unit (e.g., HD 117 of FIG.5) which stores the EPG data and reservation status information which relates to a reservation status of program recording, a reservation recording processing unit (e.g., CPU 108 of FIG.5 which carries out reserved recording processing of steps S21 through S23 of FIG.9) which carries out reservation recording processing in which a program is recorded in accordance with the reservation status information, and a first communication unit (e.g., a communication I/F 107 of FIG.5) which communicates with the communication apparatus and transmits the EPG data or the reservation status information in accordance with a request from the communication apparatus, and the communication apparatus has a second communication unit (e.g., a modem circuit section 258 and a transmitting/receiving circuit section 262 of FIG.6) which communicates with the recording apparatus and transmits a request of the EPG data or the reservation status information in accordance with an operation of a user, and receives the EPG data or the reservation status information which is transmitted from the recording apparatus, in accordance with the request, and a presenting unit (e.g., a display 32 of FIG.6) which presents the EPG data or the reservation status information which was received by the second communication unit.

The information processing system is characterized in that the second communication unit in the communication apparatus further transmits a reservation request for requesting reservation of program recording, in accordance with an operation of a user, and as to the recording apparatus, the first communication unit also carries out reception of the reservation request, and it further has a recording reservation processing unit (e.g., CPU 108 of FIG.5, which carries out processing of a step S37 of FIG.10) which carries out recording reservation processing for reserving program recording in accordance with the reservation request.

The information processing system is characterized in that the recording apparatus further has a judgment unit which judges whether the reservation requested program received by the first communication unit overlaps with a program already reserved for recording.

The information processing system is characterized in that in case that it was judged by the judgment unit that the reservation requested program overlaps with the program already reserved for recording, the first communication unit transmits overlap information to the communication apparatus.

The information processing system is characterized in that the second communication unit in the communication apparatus further receives the overlap information, and the presenting unit presents the overlap information received by the second communication unit.

The information processing system is characterized in that the second communication unit in the communication apparatus further transmits an editing request for requesting editing of the reservation status information in accordance with an operation of a user, and as to the recording apparatus, the first communication unit also carries out reception of the editing request, and it further has an editing unit (e.g., CPU 108 of FIG.5, which carries out processing of a step S40 of FIG.10) which edits the reservation status information in accordance with the editing request.

A recording apparatus for receiving and recording a program includes a receiving unit (e.g., a tuner section 101 of FIG.5) which receives a program and EPG (Electronic Program Guide) data, a storing unit (e.g., HD 117 of FIG.5) which stores the EPG data and reservation status information which relates to a reservation status of program recording, a reservation recording processing unit (e.g., CPU 108 of FIG.5, which carries out reserved recording processing of steps S21 through S23 of FIG.9) which carries out reservation recording processing for recording a program in accordance with the reservation status information, and a communication unit (e.g., a communication I/F 107 of FIG.5) which communicates with an external communication apparatus and transmits the EPG data or the reservation status information, in accordance with a request from the communication apparatus.

The recording apparatus is characterized in that, in case that the communication apparatus transmits a reservation request for requesting reservation of program recording in accordance with an operation of a user, the communication unit also carries out reception of the reservation request, and further has a recording reservation processing unit (e.g., CPU 108 of FIG.5, which carries out processing of a step S37 of FIG.10) which carries out recording reservation processing for reserving program recording, in accordance with the reservation request.

The recording apparatus further includes a judgment unit which judges whether the reservation requested program received by the communication unit overlaps with a program already reserved for recording.

The recording apparatus is characterized in that, in case that it was judged by the judgment unit that the reservation requested program overlaps with the program already reserved for recording, the communication unit transmits overlap information to the external communication apparatus.

The recording apparatus is characterized in that, in case the communication apparatus transmits an editing request for requesting editing of the reservation status information in accordance with an operation of a user, the communication unit also carries out reception of the editing request, and further has an editing unit (e.g., CPU 108 of FIG.5, which carries out processing of a step S40 of FIG.10) which edits the reservation status information in accordance with the editing request.

Figure 8:
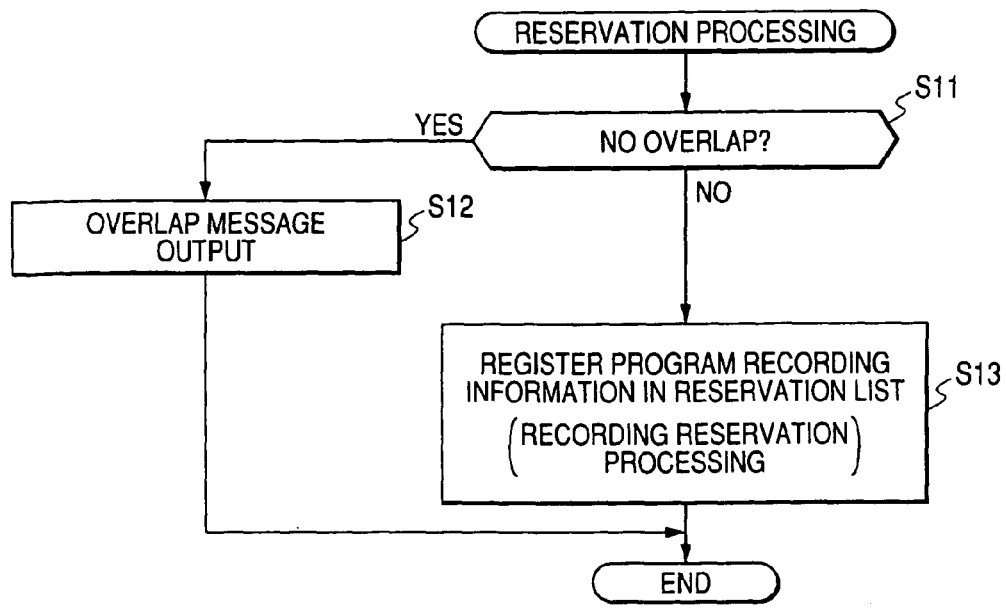
FIG. 8 is a flow chart which explains reservation processing.
Figure 9:
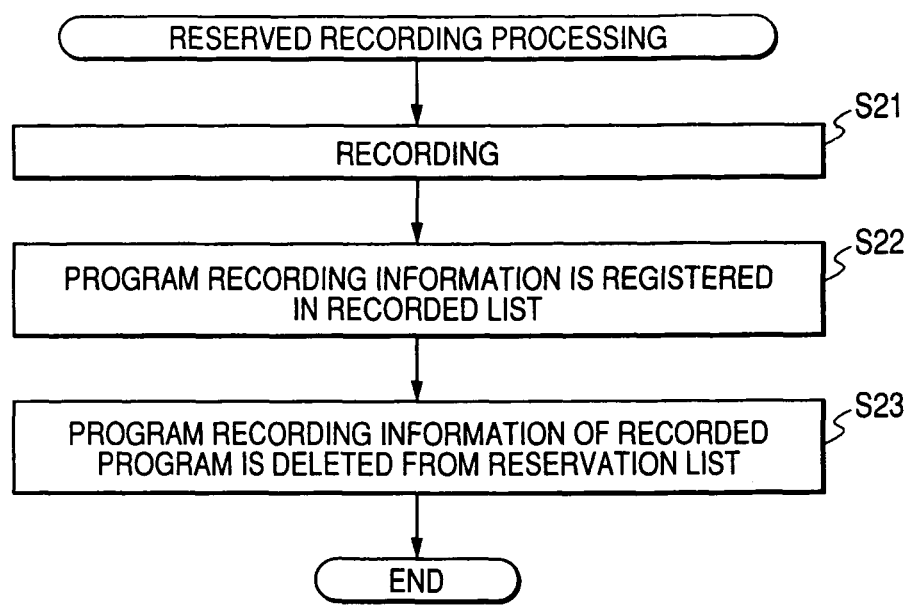
FIG. 9 is a flow chart which explains reserved recording processing.

A method for receiving and recording a program includes a receiving step (e.g., a step S1 of FIG.7) of receiving a program and EPG (Electronic Program Guide) data, a storing step (e.g., a step S3 of FIG.7, and a step S13 of FIG.8) of storing the EPG data and reservation status information which relates to a reservation status of program recording, a reservation recording processing step (e.g., steps S21 through S23 in reserved recording processing of FIG.9) of carrying out reservation recording processing for recording a program in accordance with the reservation status information, and a communication step (e.g., a step S33 of FIG.10) of communicating with an external communication apparatus, and transmitting the EPG data or the reservation status information in accordance with a request from the communication apparatus.

A recording medium is recorded with a computer program which is executable by a computer to perform a method for receiving and recording a program, the method including a receiving step (e.g., a step S1 of FIG.7) of receiving a program and EPG (Electronic Program Guide) data, a storing step (e.g., a step S3 of FIG.7, and a step S13 of FIG.8) of storing the EPG data and reservation status information which relates to a reservation status of program recording, a reservation recording processing step (e.g., steps S21 through S23 in reserved recording processing of FIG.9) of carrying out reservation recording processing for recording a program in accordance with the reservation status information, and a communication step (e.g., a step S33 of FIG.10) of communicating with an external communication apparatus and transmitting the EPG data or the reservation status information in accordance with a request from the communication apparatus.

A communication apparatus is for communicating with a recording apparatus which receives and records a program includes in case that the recording apparatus receives a program and EPG (Electronic Program Guide) data, and stores the EPG data and reservation status information which relates to a reservation status of program recording, and carries out reservation recording processing in which a program is recorded in accordance with the reservation status information, and communicates with the communication apparatus, and transmits the EPG data or the reservation status information in accordance with a request from the communication apparatus, a communication unit (e.g., a modem circuit section 258 and a transmitting/receiving circuit section 262 of FIG.6) which communicates with the recording apparatus and transmits a request of the EPG data or the reservation status information in accordance with an operation of a user, and receives the EPG data or the reservation status information which is transmitted from the recording apparatus in accordance with the request, and a presenting unit (e.g., a display 32 of FIG.6) which presents the EPG data or the reservation status information which was received by the communication unit.

The communication apparatus is characterized in that the communication unit further transmits a reservation request for requesting reservation of program recording in accordance with an operation of a user, and the recording apparatus further carries out recording reservation processing for reserving program recording in accordance with the reservation request.

The communication apparatus is characterized in that the communication unit further receives overlap information which is transmitted in case that it was judged in the recording apparatus that the reservation requested program overlaps with a program already reserved for recording, and the presenting unit presents the overlap information received by the communication unit.

The communication apparatus is characterized in that the communication unit further transmits an editing request for requesting editing of the reservation status information in accordance with an operation of a user, and the recording apparatus further edits the reservation status information in accordance with the editing request.

A method of a communication apparatus for communicating with a recording apparatus which receives and records a program includes in case that the recording apparatus receives a program and EPG (Electronic Program Guide) data, and stores the EPG data and reservation status information which relates to a reservation status of program recording, and carries out reservation recording processing in which a program is recorded in accordance with the reservation status information, and communicates with the communication apparatus, and transmits the EPG data or the reservation status information in accordance with a request from the communication apparatus, a communication step (e.g., steps S64 and S65 of FIG.11) of communicating with the recording apparatus and transmitting a request of the EPG data or the reservation status information in accordance with an operation of a user, and receiving the EPG data or the reservation status information which is transmitted from the recording apparatus in accordance with the request, and a presenting step (e.g., a step S66 of FIG.11) of presenting the EPG data or the reservation status information which was received in the communication step.

A recording medium is recorded with a computer program which is executable by a computer to perform a method of controlling a communication apparatus which communicates with a recording apparatus for receiving and recording a program, the method including in case that the recording apparatus receives a program and EPG (Electronic Program Guide) data, and stores the EPG data and reservation status information which relates to a reservation status of program recording, and carries out reservation recording processing in which a program is recorded in accordance with the reservation status information, and communicates with the communication apparatus, and transmits the EPG data or the reservation status information in accordance with a request from the communication apparatus, a communication step (e.g., steps S64 and S65 of FIG.11) of controlling communication with the recording apparatus and transmitting a request of the EPG data or the reservation status information in accordance with an operation of a user, and receiving the EPG data or the reservation status information transmitted from the recording apparatus in accordance with the request, and a presenting step (e.g., a step S66 of FIG. 11) of presenting the EPG data or the reservation status information which was received in the communication step.

Hereinafter, with reference to the drawings, embodiments of the invention will be described.

Figure 1:
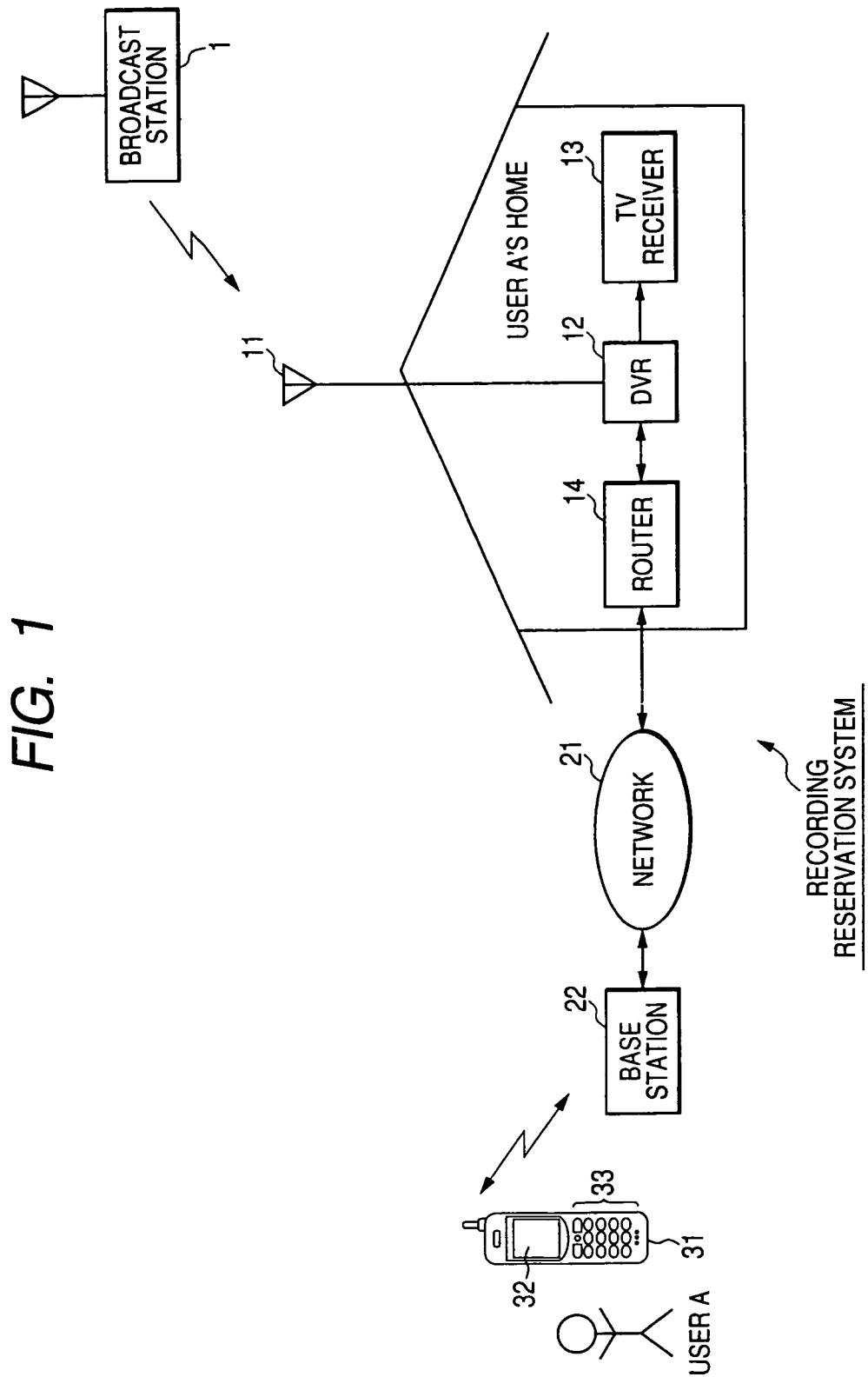
FIG. 1 is a view which shows a configuration example of one embodiment of a recording reservation system to which the invention was applied.

FIG. 1 shows a configuration example of one embodiment of a recording reservation system to which the invention was applied.

In the recording reservation system of FIG. 1, a broadcast station 1 is, for example, a broadcast station which carries out television broadcasting, and is transmitting video data and audio data, and EPG data, as a program, by way of for example, digital broadcast waves. In FIG. 1, the broadcast station 1 carries out broadcasting by wireless, but it is all right even if the broadcast station 1 carries out broadcasting by wire.

In a user A's home which is a house of a user A, an antenna 11, DVR 12, a TV (Television) receiver 13, and a router 14 are placed.

The antenna 11 receives digital broadcast waves from the broadcast station 1, and supplies broadcast signals such as program data (video data and audio data of a program) and EPG data, to DVR 12. DVR 12 receives the broadcast signals which are supplied from the antenna 11, and records (records) (stores) the program data and EPG data which are included in the broadcast signals.

Further, DVR 12 reproduces the recorded program data, and supplies it to the TV receiver 13. That is, DVR 12 is connected to the TV receiver 13, and the program data, which was reproduced in DVR 12, is supplied to the TV receiver 13. The TV receiver 13 displays images which correspond to the video data as the program data which is supplied from DVR 12, and outputs sounds which correspond to the audio data.

In addition, DVR 12 is connected to a network 21 through the router 14, and carries out communication through the use of the router 14 and the network 21.

The router 14 is connected to DVR 12, and further to an electronic device in the user A's home, which is not shown in the figure. Further, the router 14 is connected to the network 21, and carries out control etc. of routing as to a network which is configured by an electronic device starting with DVR 12 in the user A's home (so-called home network) and the network 21.

Here, the network 21 is, for example, Internet, and a global ID (Internet Protocol) address is allocated to the router 14 on the side to which the network 21 is connected (so-called WAN (Wide Area Network) side). In addition, a private IP address is allocated to the router 14 on the side to which an electronic device in the user A's home such as DVR 12 is connected (so-called LAN (Local Area Network) side). Further, a private IP address is also allocated to an electronic device in the user A's home starting with DVR 12 which is connected to the router 14.

Therefore, in order for DVR 12 to communicate with the network 21 which is Internet through the router 14, NAT (Network Address Translation), and what is more, according to need, a technology called as IP masquerade becomes necessary, but it is assumed that the router 14 has a function of NAT, and what is more, according to need, a function of IP masquerade.

To the network 21, a base station 22, which is managed and operated by a company of so-called carrier of portable telephones, is connected. The base station 22 controls communication with portable telephones which are located in a cell (zone) which is an area for enabling communication with itself (base station 22), and this enables communication (telephone call) between a certain portable telephone and another portable telephone, which are located in the cell. Further, the base station 22 enables communication between portable telephones located in the cell and the network 21.

The portable telephone 31 has a display 32 on which various information is displayed, an operating section 33 which is configured by keys etc. which are operated at the time of inputting a telephone number, and so on, and carries out communication for telephone call and other processing.

Here, in FIG. 1, a user A, who is out of the user A's home, is located in a cell of the base station 22. Further, the user A has the portable telephone 31 of a carrier company which manages and operates the base station 22. Therefore, the portable telephone 31, which is possessed by the user A, can communicate with another portable telephone which is not shown in the figure, through the base station 22. In addition, the portable telephone 31 can communicate with a server on the network 21 which is Internet, through the base station 22. Further, the portable telephone 31 is configured so as to be able to communicate with DVR 12, thorough the router 14 in the user A's home, which is connected to the network 21.

Meanwhile, in order for the portable telephone 31 to communicate with DVR 12 through the router 14, there is need to realize so-called NAT traversal. Here, for ease of explanation, it is assumed that the portable telephone 31 recognizes a NAT traversal method of the router 14. That is, for example, it is assumed that the router 14 is set up so as to transmit a packet addressed to a specific port (IP packet) among IP packets addressed to the router 14 (IP packet addressed to an IP address which was allocated to the WAN side of the router 14) from the network 21, to DVR 12, as a packet addressed to DVR 12, and the portable telephone 31 recognizes the specific port and a global IP address which is allocated to the router 14.

In the recording reservation system which is configured as above, digital broadcast waves from the broadcast station 1 are received in the antenna 11, and broadcast signals, which are obtained in consequence, are supplied to DVR 12. In DVR 12, the broadcast signals, which are supplied from the antenna 11, are received, and EPG data, which is included in the broadcast signals, is stored (recorded).

Figure 2:
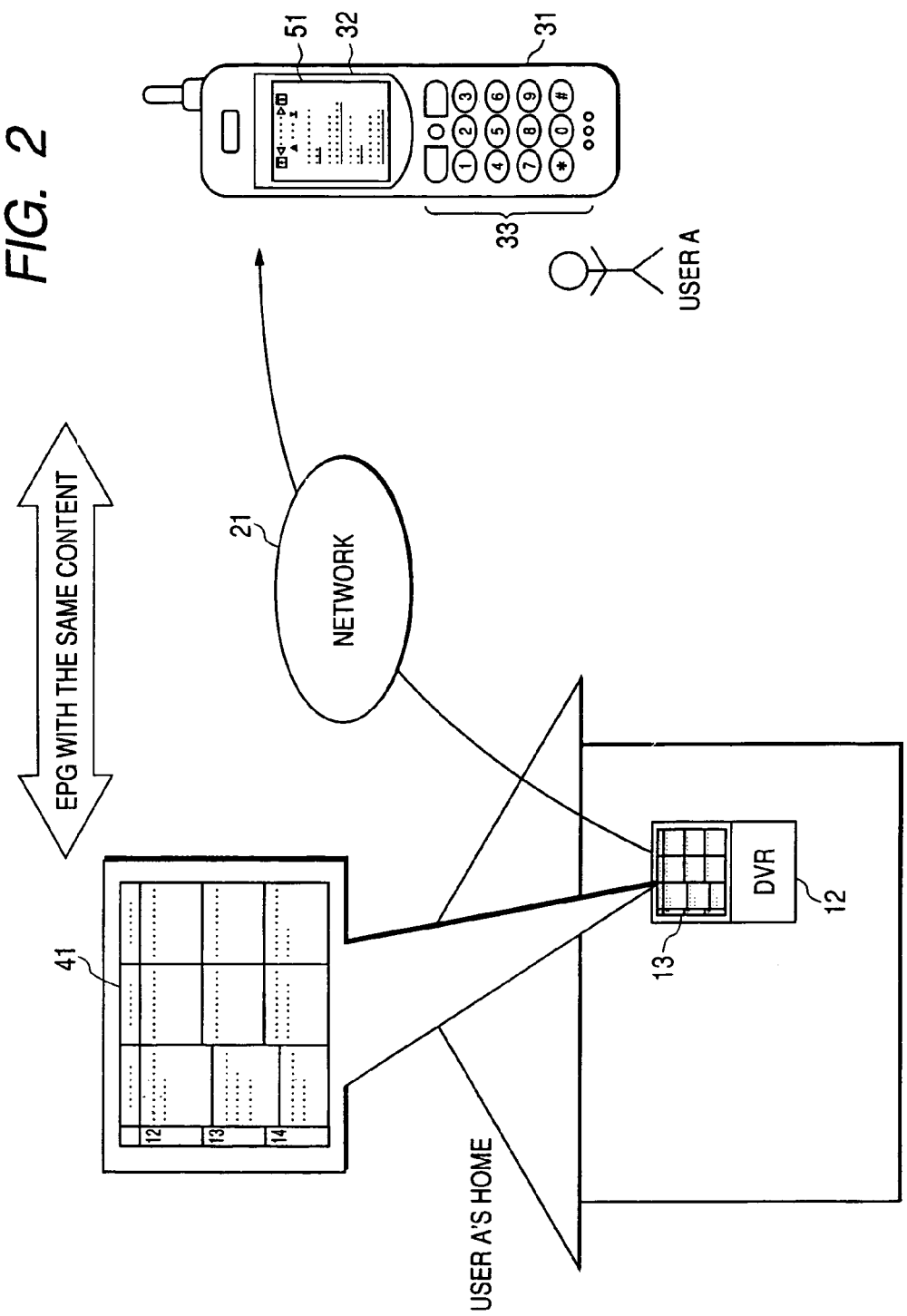
FIG. 2 is a view which explains such a matter that it is possible to browse EPG data stored in DVR 12, on a portable telephone 31.

The EPG data, which was stored in DVR 12, can be browsed (viewed) on the TV receiver 13 in the user A's home, and can be also obtained and browsed in the portable telephone 31 which is possessed by the user A at a place where one is away from home as shown in FIG. 2.

That is, when the user A in the user A's home operates a remote controller (remote commander) of DVR 12, which is not shown in the figure, in order to display EPG, DVR 12 prepares, for example, an EPG screen 41 as shown in FIG. 2, from EPG data which has been already stored in itself, and supplies it to the TV receiver 13 to display it.

In addition, when the user A at a place where one is away from home operates the operating section 33 of the portable telephone 31, in order to display EPG, the portable telephone 31 communicates with DVR 12 through the base station 22, the network 21, and the router 14, and thereby, requests DVR 12 for EPG. DVR 12, upon the request, prepares, for example, a program table list screen 51 as shown in FIG. 2, which is a web page of EPG, from the EPG data which has been already stored in itself, and transmits it to the portable telephone 31, through the router 14, the network 21, and the base station 22. The portable telephone 31 receives the program table list screen 51 from DVR 12, and displays it on the display 32.

Here, in FIG. 2, the EPG screen 41 which is displayed on the TV receiver 13, and the program table list screen 51 which is displayed on the display 32 of the portable telephone 31 are ones which are prepared from identical EPG data, and therefore, it is possible to make their contents (information quantity) identical. Meanwhile, respective configurations (layouts) of the EPG screen 41 and the program table list screen 51 may be identical, and may be different.

In this regard, however, assuming that the program table list screen 51, which is displayed on the display 32 of the portable telephone 31, is a screen (image) which is of an identical configuration to the EPG screen 41, a size of the display 32 of the portable telephone 31 is generally smaller than a size of a display screen of the TV receiver 13, and therefore, there is such fear that it becomes difficult to take a look at display of the program table list screen 51 in the portable telephone 31. Then, it is desirable that the program table list screen 51, which is displayed on the display 32 of the portable telephone 31, is configured in such a manner that it does not become difficult to take a look at a display even if it is a small size display like the display 32.

Figure 3:
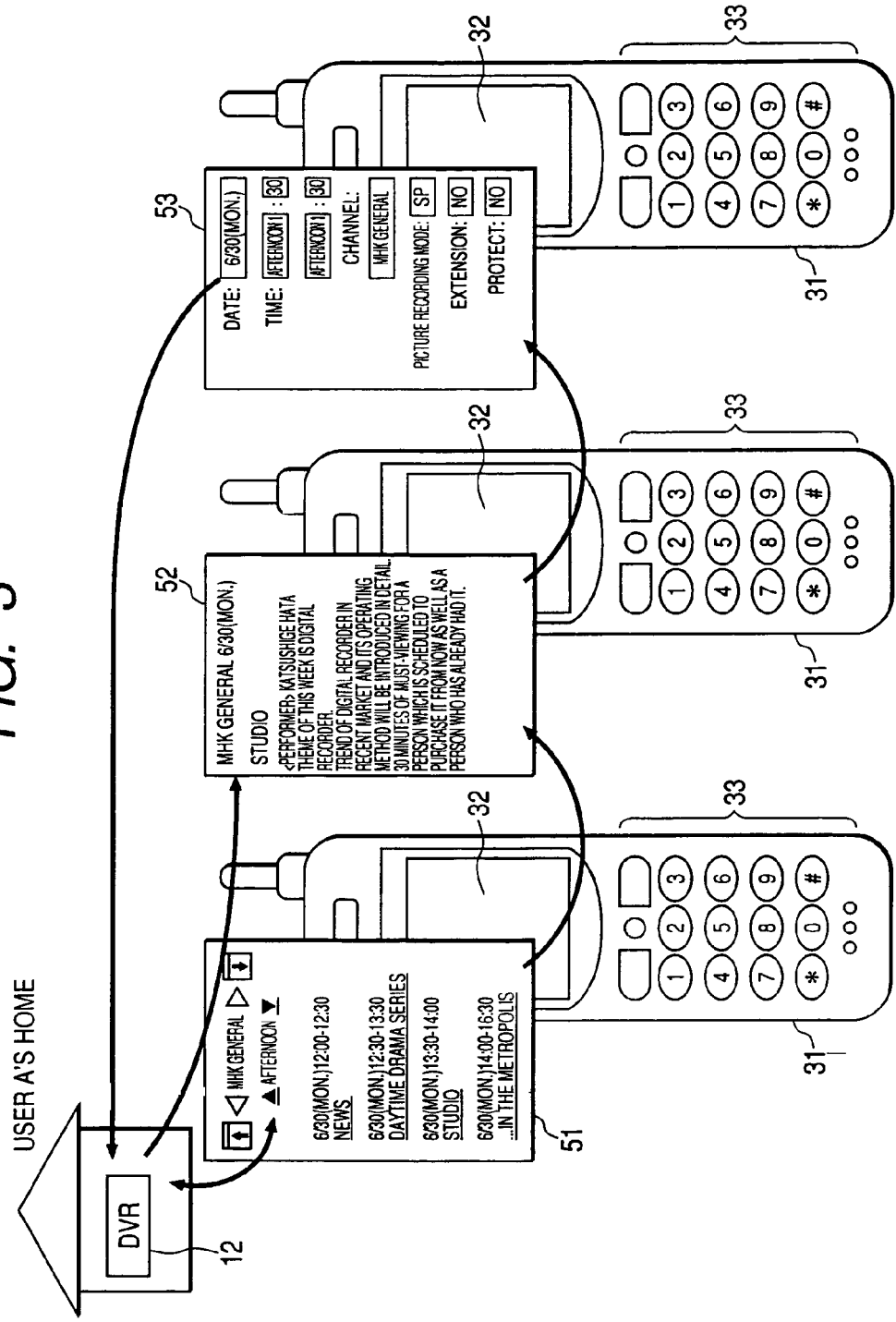
FIG. 3 is a view which shows a display example of a screen which is displayed on a display 32.
Figure 4:
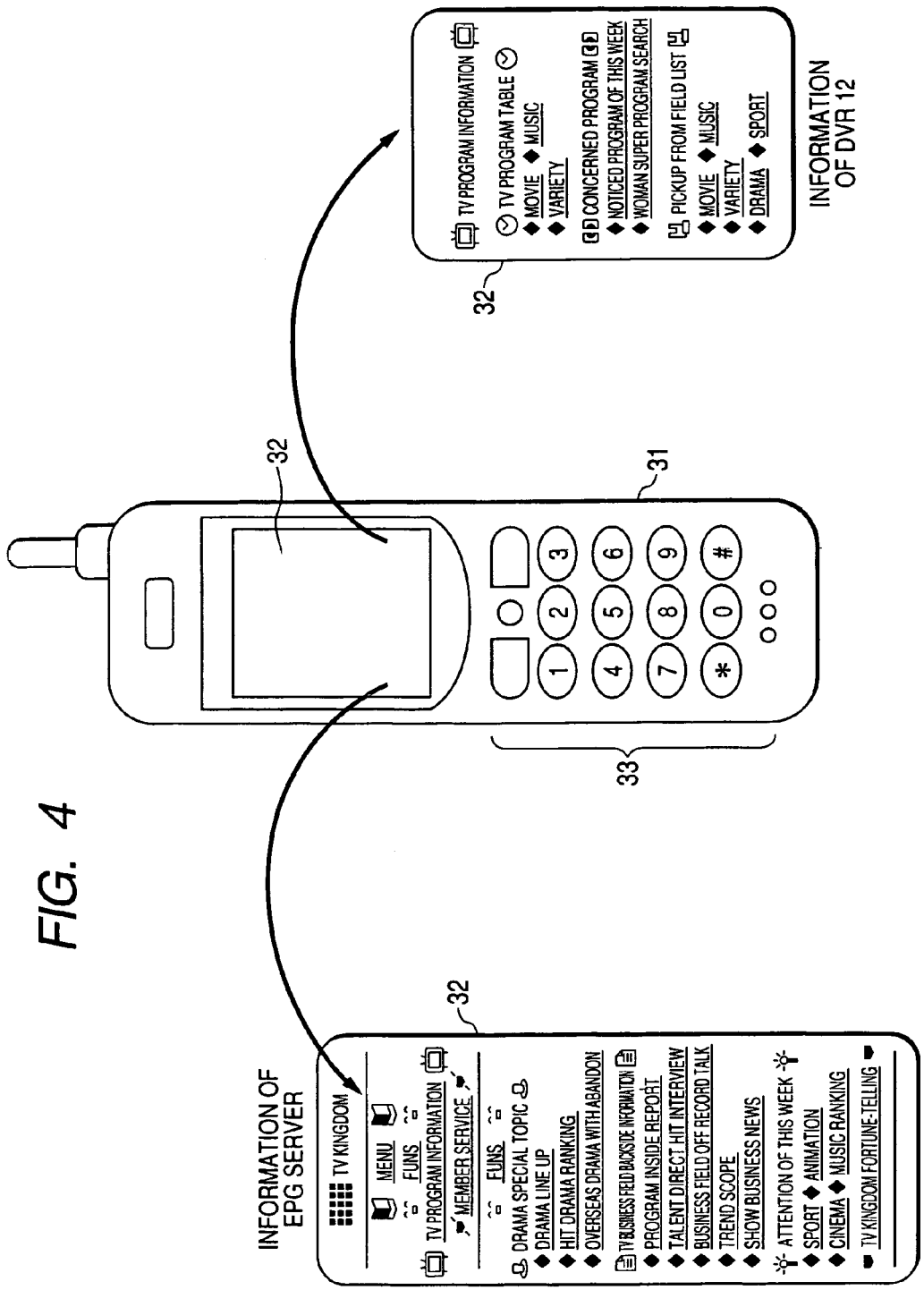
FIG. 4 is a view which shows a display example of a screen which is displayed on the display 32.

Next, FIG. 3 and FIG. 4 show display examples of a screen which is displayed on the display 32 of the portable telephone 31.

For example, DVR 12 has a function of a web server, and the portable telephone 31 has a function of a web browser, and when a user A operates the operating section 33 of the portable telephone 31 to requests DVR 12 for EPG, DVR 12 prepares the program table list screen 51 which is a web page, from EPG data which has been already stored in itself, and transmits it to the portable telephone 31.

The portable telephone 31 receives the program table list screen 51 from DVR 12 and displays it. That is, in the portable telephone 31, the program table list screen 51 as shown at a first place from the left in FIG. 3 is displayed on its display 32.

On the program table list screen 51 of FIG. 3, information of programs, which are broadcasted in a channel "NHK General", is displayed. In FIG. 3, as program information, channel (name), program broadcast date, broadcast starting time, broadcast ending time, and title etc. are displayed.

Meanwhile, the program table list screen 51 can be scrolled in a horizontal direction, and for example, when the operating section 33 of the portable telephone 31 is operated so as to carry out scroll in a horizontal direction, the program table list screen 51 is scrolled in a horizontal direction depending on the operation, and by this means, information of programs, which are broadcasted in another channel, is displayed on the display 32. In addition, the program table list screen 51 can be scrolled in a vertical direction, and for example, when the operating section 33 of the portable telephone 31 is operated so as to carry out scroll in a vertical direction, the program table list screen 51 is scrolled in a vertical direction, depending on the operation, and by this means, information of a program, which is broadcasted in the same channel at another time zone, is displayed on the display 32.

Among information of programs which are displayed on the program table list screen 51, for example, (display of) a title of a program is linked to a program detail screen 52 which is a web page in which description etc. of a content of the program was described. When a user A operates the operating section 33 of the portable telephone 31 and selects (clicks) a desired title which was displayed on the program table list screen 51, a request of the program detail screen 52, which corresponds to the title, is transmitted to DVR 12.

DVR 12 prepares the program detail screen 52 from EPG data which has been already stored in itself, depending on the request of the program detail screen 52 from the portable telephone 31, and transmits it to the portable telephone 31. The portable telephone 31 receives the program detail screen 52 from DVR 12 and displays it. That is, in the portable telephone 31, the program detail screen 52 as shown at a second place from the left in FIG. 3 is displayed on its display 32.

In the program detail screen 52 of FIG. 3, a channel of a program, broadcast date, performers of the program, and an outline of an explanation of a content of the program are displayed.

In case that a user A takes a look at, for example, the program detail screen 52 and desires to make a recording reservation of a program which is introduced by the program detail screen 52, the operating section 33 of the portable telephone 31 is operated so as to instruct a recording reservation of the program.

The portable telephone 31 displays a reservation screen 53 for setting up program recording information which is information necessary for reserved recording, on the display 32, depending on the instruction of the recording reservation.

That is, an example of the reservation screen 53 is shown at a third place from the left (right most) in FIG. 3.

On the reservation screen 53, a "date" column, a "time" column, a "channel" column, a "recording mode" column, an "extension" column, and a "protect" column are disposed.

In the "date" column, broadcast date of a program which is a target for recording reservation (hereinafter, arbitrarily referred to as reservation target program) is displayed, and in the "time" column, broadcast starting time and broadcast ending time of the reservation target program are displayed, and in the "channel" column, a channel, on which the reservation target program is broadcasted, is displayed, respectively. Meanwhile, the reservation target program is a program introduced on the program detail screen 52 which was displayed on the display 32 at the time that there was an instruction of recording reservation, and data, which is displayed in the "date" column, the "time" column, and the "channel" column as to the reservation target program, may be obtained, for example, from information which was used for displaying the program table list screen 51 (EPG data), and may be freshly obtained from DVR 12.

In the "recording mode" column, a recording mode at the time of recording the reservation target program is displayed. In FIG. 3, "SP", which represents a recording mode of recording with standard image quality (sound quality), is displayed. As another recording mode, there is, for example, a mode of recording with low image quality and with high sound quality.

In the "extension" column, extension information, which represents, on condition that the reservation target program is, for example, a program subsequent to a program such as broadcast relayed from a ballpark, whether recording time of the reservation target program is extended or not, in preparation for such a case that the broadcast relayed from a ballpark is extended, is displayed. In FIG. 3, "No", which represents that recording time is not extended, is displayed.

In the "protect" column, program information, which represents whether or not protect for preventing erasure of (video data and audio data of) the program is given after the reservation target program was recorded, is displayed. In FIG. 3, "No", which represents that the protect is not given, is displayed.

Here, in FIG. 3, "SP" of a recording mode which is displayed in the "recording mode" column, "No" of extension information which is displayed in the "extension" column, and "No" of protect information which is displayed in the "protect" column are, for example, default setups, and these setups can be changed by such a manner that a user operates the operating section 33 of the portable telephone 31. Meanwhile, on the reservation screen 53, it is possible to change setups of the "date" column, the "time" column, and the "channel" column, by such a matter that a user operates the operating section 33 of the portable telephone 31.

A user A, in case of desiring a recording reservation of a reservation target program with a content displayed on the reservation screen 53, operates the operating section 33 of the portable telephone 31 so as to fix the recording reservation. In this case, the portable telephone 31 transmits information which is set up (displayed) on the reservation screen 53, as program recording information which is necessary for reserved recording of the reservation target program, together with a request of recording reservation (reservation request), to DVR 12.

DVR 12 carries out recording reservation processing for making a reservation of recording (making a recording reservation) of a reservation target program, by use of program recording information which is transmitted in response to a reservation request from the portable telephone 31, together with the reservation request.

Meanwhile, the portable telephone 31 obtains, from DVR 12, (program table list screen 51 etc. prepared from) EPG data which has been already stored therein, and displays it, as described above, and in addition, in the same manner as in the past, can access to an EPG server (not shown in the figure) on the network 21 which is Internet, and obtain EPG to display it.

That is, for example, as shown in FIG. 4, in the portable telephone 31, it is possible to obtain EPG data from DVR 12 and display it, and it is also possible to obtain EPG from an EPG server and display it.

In addition, in the portable telephone 31, it is possible to obtain other information than EPG data from DVR 12, i.e., for example, information which represents a status of recording reservation (reservation status information) etc. and display it. In this case, a user, taking a look at a status of recording reservation in DVR 12 from a place where one is away from home, can check whether recording reservation of a program which is about to be made from now, was already made or not, or whether the recording reservation of the program is overlapped with recording reservation of another program or not, etc.

Next, FIG. 5 shows a configuration example of DVR 12 of FIG. 1

In DVR 12 of FIG. 5, a tuner section 101, a demultiplexer 102, a video decoder 103, a communication I/F (Interface) 107, CPU (Central Processing Unit) 108, ROM (Read Only Memory) 111, RAM (Random Access Memory) 112, EEPROM (Electrically Erasable and Programmable ROM) 113, a disk drive 114, a HD (Hard Disk) drive 116, and an encoder 118 are connected mutually through a bus.

Then, it is configured in such a manner that broadcast signals are supplied to the tuner section 101 from the antenna 11. The tuner section 101 receives and demodulates broadcast signals from the antenna 11, in accordance with control from CPU 108 through the bus, and supplies packets of a given channel (packets which were transmitted in a frequency band), to the demultiplexer 102.

The demultiplexer 102 selects packets of a give program, from packets which are supplied from the tuner section 101, in accordance with control from CPU 108 through the bus, and supplies packets of video data among packets of the program, to the video decoder 103, and supplies packets of audio data to the audio decoder 104.

In addition, the demultiplexer 102, in case that reproduction of packets of a program, which was recorded in HD 117 which will be described later, was requested from a user, also supplies packets of a program which are supplied from (HD drive 116 which incorporates) the HD 117 through the bus, to the video decoder 103 and the audio decoder 104.

Further, the demultiplexer 102 selects packets of EPG data from packets which are supplied from the tuner section 101, and outputs them on the bus. EPG data, which was outputted from the demultiplexer 102 on the bus, is supplied to the HD 117 and is recorded (stored) therein.

In addition, the demultiplexer 102 outputs program packets which were selected from packets which are supplied from the tuner section 101, on the bus, according to need. Program packets, which were outputted from the demultiplexer 102 on the bus, are supplied to the HD 117 and are recorded therein.

The video decoder 103 decodes packets of video data from the demultiplexer 102, and outputs video data, which is obtained in consequence, from a video output terminal 105. The video output terminal 105 is connected, for example, to the TV receiver 13 (FIG. 1), and therefore, in the TV receiver 13, images, which correspond to video data obtained in the video decoder 103, are displayed.

Meanwhile, the video decoder 103 incorporates an OSD (On Screen Display) section 103A. The video decoder 103 overlaps information to be ODS-displayed in the OSD section 103A, which is supplied from CPU 108 etc. through the bus, with a decoded result of packets, and outputs video data which is obtained as a result of the overlapping. Here, as the information to be OSD-displayed, there are, for example, (number which represents) channel, (information which represents) sound volume, EPG (EPG screen 41 (FIG. 2)), a reservation list and a recorded list which will be described later.

The audio decoder 104 decodes packets of audio data from the demultiplexer 102, and outputs audio data which is obtained in consequence, to an audio output terminal 106. The audio output terminal 106 is connected, for example, to the TV receiver 13 and therefore, in the TV receiver 13, sounds, which correspond to audio data obtained by the audio decoder 104, are outputted.

The communication I/F 107 is configured by for example, NIC (Network Interface Card) etc. The communication I/F 107 is connected to the router 14 (FIG. 1), and controls communication with the router 14. Meanwhile, the communication I/F 107 can carry out communication, for example, by each of wireless and wire.

CPU 108 executes a program which was stored in ROM 111, a program which was recorded in HD 117 and loaded to RAM 112, and a program which was stored in EEPROM 113, and by this means, carries out various kinds of processing such as control of each block which configures DVR 12. In addition, it is configured in such a manner that operation information, which is dependent on an operation of a user, is supplied from an operation panel 109 and a light receiving section 110 to CPU 108, and it also carries out processing which corresponds to its operation signal.

The operation panel 109 is configured by various buttons etc. which were disposed on a housing of DVR 12. Then, the operation panel 109, when it is operated by a user, supplies an operation signal which corresponds to the operation, to CPU 108.

The light receiving section 110 receives wireless signals (e.g., infrared light) (receives light) from a remote controller of DVR 12, which is not shown in the figure, and supplies it to CPU 108. That is, when a remote controller is operated, the remote controller transmits an operation signal which corresponds to its operation by wireless, and the light receiving section 110 receives the operation signal which is transmitted by the remote controller, and supplies it to CPU 108.

ROM 111 stores a program etc. to be firstly executed, for example, when a power source of DVR 112 is turned into an ON status. In RAM 112, a program to be executed by CPU 108 is loaded from HD 117 through a bus. In addition, RAM 112 stores data necessary for an operation of CPU 108. EEPROM 113 stores information which should be kept even after the power source of DVR 12 was turned into an OFF status. As information which is stored by EEPROM 113, for example, there is a channel etc. which was tuned (selected) right before the power source of DVR 12 is turned into the OFF status. When the power source of DVR 12 is turned into the ON status next time, a channel, which was tuned right before the power source of DVR 12 is turned into the OFF status, is tuned again on the basis of information which was stored in EEPROM 113.

The disk drive 114 drives a disk 115 as a recording medium which can be attached to and detached from it, and by this means, records data which is supplied through a bus, on the disk 115, and in addition, reads out data (including a program) which was recorded on the disk 115, and outputs it on the bus. Here, as the disk 115, it is possible to adopt, for example DVD and a blue-ray disk etc.

The HD drive 116 is incorporating HD 117, and drives the HD 117. By this means, the HD drive 116 records data, which is supplied through the bus, on HD 117, and in addition, reads out data which was recorded on HD 117, and outputs it on the bus.

Here, in HD 117, various application programs are installed in order for DVR 12 to carry out operations which will be described later. In FIG. 5, as one of the suchlike application programs, a program of a web server (web server program) is shown in the figure. CPU 108 executes the web server program, and thereby, DVR 12 functions as a web server. Meanwhile, although it is not shown in the figure, in HD 117, a program of OS (Operating System) is installed besides the application programs.

In addition, in HD 117, EPG data which is supplied from the demultiplexer 102 through the bus, and what is more, a reservation list and a recorded list etc., which will be described later, are recorded.

Further, in HD 117, recording of a program, i.e., recording of packets of a program is carried out.

The encoder 118 encodes, for example, video data and audio data which are inputted from an external input terminal which is not shown in the figure, and outputs its encoded result on the bus. The encoded result of the video data and audio data which were outputted on the bus by the encoder 118 is supplied, for example, to the HD drive 116, and recorded in HD 117 which is incorporated therein.

Meanwhile, in the above-described case, it is configured in such a manner that packets etc. of a program are recorded in HD 117, but it is also possible to record the packets etc. of a program, on the disk 115 by the disk drive 114. Further, it is possible to copy or move packets etc. of a program which were recorded on one of the disk 115 or HD 117, to the other of them.

Here, it is possible to preliminarily record a program which is executed by CPU 108, in ROM 111, EEPROM 113, HD 117 as a recording medium which is incorporated in DVR 12.

Alternately, it is possible to temporarily or permanently store (record) the program in the disk 115 and a semiconductor memory which is not shown in the figure, as a removable recording medium. It is possible to provide the suchlike disk 115 and semiconductor memory, as so-called package software.

Further, it is possible to realize such a matter that a program is installed in DVR 12 from the disk 115 etc., and is transferred by wireless to DVR 12 through an artificial satellite r for digital satellite broadcast, from a download site, and is transferred by wire to DVR 12 through the network 21 such as LAN (Local Area Network) and Internet, and in DVR, the program, which is transferred in that manner, is received by the communication I/F 107, and installed in HD 117 which is incorporated therein.

Next, FIG. 6 shows a configuration example of the portable telephone 31 of FIG. 1.

The portable telephone 31 is configured in such a manner that a power supply circuit section 251, an operation input control section 252, an image encoder 253, a camera interface section 254, a display control section 255, an image decoder 256, a multiplexing/separating section 257, a recording/reproducing section 224, a modem circuit section 258 and a voice codec 259 are mutually connected through a bus, to a main control section 250 which uniformly controls each section which configures it.

The main control section 250 is configured by CPU 201, ROM 202, RAM 203, and EEPROM 204 etc., and carries out control of each section and other processing through the bus, by such a matter that CPU 201 executes a program which was stored in ROM 202, a program which was loaded in RAM 203, and a program which was stored in EEPROM 204.

Here, it is possible to preliminarily install the programs which are carried by CPU 201, in ROM 202 and EEPROM 204. In addition, it is also possible to download the programs in the portable telephone 31 by communication passing through the base station 22, and to install them in EEPROM 204. Further, it is also possible to record the programs in a memory stick (trademark) 223, and read out them by the recording/reproducing section 224, and install them in EEPROM 204.

The power supply circuit section 251 activates the portable telephone 31 in an operable status, by supplying electric power to each section from a battery pack which is not shown in the figure, when call-end and power supply keys, which are not shown in the figure in the operating section 33, are turned into ON statuses by an operation of a user.

The portable telephone 31 converts audio signals, which were collected by a microphone 221 at the time of a voice telephone call mode, on the basis of control of the main control section 250, into digital audio data by the voice codec 259, and applies spread spectrum processing to this, by the modem circuit section 258, and applies digital-to-analog conversion processing and frequency conversion processing thereto by the transmitting/receiving circuit section 262, and thereafter, transmits it through an antenna 214.

In addition, the portable telephone 31 amplifies reception signals which were received by the antenna 214 at the time of the voice telephone call mode, and applies frequency conversion processing and analog-to-digital conversion processing thereto, and applies inverse spread spectrum processing thereto by the modem circuit section 258, and converts it into analog voice signals by the voice codec 259, and thereafter, outputs this through a speaker 217.

Further, the portable telephone 31, in case of transmitting an electronic mail at the time of a data communication mode, sends out text data of the electronic mail which was inputted by operations of an operation key 219 and a jog dial 222 which configure the operating section 33, to the main control section 250 through the operation input control section 252.

The main control section 250 applies spread spectrum processing to the text data by the modem circuit section 258, and applies digital-to-analog conversion processing and frequency conversion processing thereto by the transmitting/ receiving circuit section 262, and thereafter, transmits it to the base station 21 (FIG. 1) through the antenna 214.

In contrast to this, the portable telephone 31, in case of receiving an electronic mail at the time of a data communication mode, applies inverse spread spectrum processing to reception signals which were received from the base station 22 through the antenna 214, by the modem circuit section 258, to restore the original text data, and thereafter, displays it as an electronic mail on the display 32 through the display control section 255.

After this, the portable telephone 31 is also capable of recording the electronic mail, which was received depending on an operation of a user, in a memory stick (trademark) 223 through the recording/reproducing section 224.

On one hand, the portable telephone 31, in case of transmitting image data at the time of the data communication mode, supplies image data, which was imaged by the CCD (Charge Coupled Device) camera 216, to the image encoder 253 through the camera interface section 254. Meanwhile, it is also possible to display the image data, which was imaged by the CCD camera 216, directly on the display 32 through the camera interface section 254 and the display control section 255.

The image encoder 253 converts the image data which was supplied from the CCD camera 216, into encoded image data, by realizing compression encoding, through the use of a predetermined encoding method such as MPEG (Moving Picture Experts Group)2 and MPEG4, and sends out this to the multiplexing/separating section 257.

At the same time as this time, the portable telephone 31 sends out voices which were collected by the microphone 221 during a period of imaging by the CCD camera 216, to the multiplexing/separating section 257 as digital voice data, through the voice codec 259.

The multiplexing/separating section 257 multiplexes the encoded image data which was supplied from the image encoder 253 and the voice data which was supplied from the voice codec 259, by a predetermined method, and applies spread spectrum processing to multiplexed data which is obtained in consequence, by the modem circuit section 258, and applies digital-to-analog conversion processing and frequency conversion processing thereto by the transmitting/receiving circuit section 262, and thereafter, transmits it through the antenna 214.

Meanwhile, in the portable telephone 31, it is possible to transmit other data such as an electronic mail, image data and voice data, at the time of the data communication mode. That is, in the portable telephone 31, when the operation key 219 and the jog dial 222, which configure the operating section 33, are operated, data corresponding to the operation is supplied to the main control section 250 through the operation input control section 252.

The main control section 250 applies spread spectrum processing to data from the operation input control section 242 by the modem circuit section 258, and applies digital-to-analog conversion processing and frequency conversion processing thereto by the transmitting/receiving circuit section 262, and thereafter, transmits it to the base station 22 (FIG. 1) through the antenna 214.

Further, in the portable telephone 31, it is possible to receive data of a web page and others, at the time of the data communication mode.

That is, in the portable telephone 31, for example, when data for requesting a web page is transmitted as described above, at the time of the data communication mode, data of the web page is transmitted through the base station 22 (FIG. 1) in response to the request, and therefore, the data of the web page is received by the transmitting/receiving circuit section 262 and the modem circuit section 258 through the antenna 214. The transmitting/receiving circuit section 262 and the modem circuit section 258 process the received web page data as described above, and send it out to the main control section 250.

The main control section 250 interprets the web page data, and prepares a screen (image) on the basis of the interpretation. This screen is supplied to the display 32 from the main control section 250 through the display control section 255 and is displayed thereon.

That is, in the main control section 250, at least a program of a web browser is installed in its EEPROM 204, and CPU 201 executes the program, and thereby, functions as the web browser, to carry out interpretation etc. of web page data.

In addition, in the portable telephone 31, it is possible to receive, for example, data of a moving image file which was linked to a web page etc., at the time of the data communication mode. In this case, inverse spread spectrum processing is applied to reception signals which were received from the base station 22 through the antenna 214, by the modem circuit section 258, and multiplexed data, which is obtained in consequence, is sent out to the multiplexing/separating section 257.

The multiplexing/separating section 257 separates the multiplexed data into encoded image data and voice data, and supplies the encoded image data to the image decoder 256 through the bus, and supplies the voice data to the voice codec 259.

The image decoder 256 decodes the encoded image data by a decoding method which corresponds to a predetermined encoding method such as MPEG2 and MPEG4, and thereby, prepares reproduced moving image data, and supplies this to the display 32 through the display control section 255, and by this means, for example, moving image data, which is included in a moving image file linked from a web page, is displayed.

At the same time as this time, the voice codec 259 converts the voice data into analog voice signals, and thereafter, supplies this to the speaker 217, and by this means, for example, voice data, which is included in the moving image file linked from the web page, is reproduced.

Also in this case, in the same manner as in case of an electronic mail, the portable telephone 31 can record the data linked from the web page etc., in the memory stick 223 through the recording/reproducing section 224 by an operation of a user.

Next, with reference to flow charts of FIG. 7 through FIG. 10, an operation of DVR 12 of FIG. 5 will be described.

Figure 7:
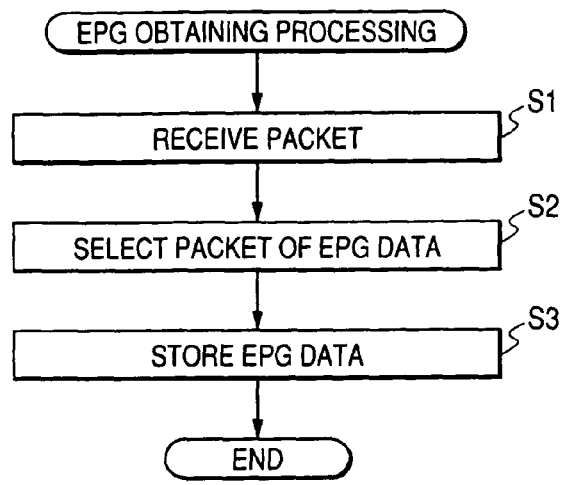
FIG. 7 is a flow chart which explains EPG obtaining processing.

Firstly, with reference to the flow chart of FIG. 7, EPG obtaining processing, in which DVR 12 obtains EPG data, will be described.

The tuner section 101 receives broadcast signals from the antenna 11 (FIG. 1) in a step S1, and supplies packets of a given channel (frequency band) to the demultiplexer 102, in accordance with control of CPU 108, to proceed on to a step S2.

In the step S2, the demultiplexer 102 selects packets in which EPG data is placed, from the packets which are supplied from the tuner section 101, in accordance with control of CPU 108 and supplies them to CPU 108 through the bus, to proceed on to a step S3.

In the step S3, CPU 108 extracts EPG data from the packets from the demultiplexer 108, and supplies it to the HD drive 116. The HD drive 116 records (stores) the EPG data from CPU 108 in HD 117.

By doing things as described above, EPG data is recorded in HD 117. Meanwhile, old data among the EPG data which was recorded in HD 117, i.e., for example EPG data of a day-old program, is to be arbitrarily deleted, by such a matter that CPU 108 controls the HD drive 116.

In case that EPG data is recorded in HD 117, for example, when the operation panel 109 or a remote controller (hereinafter, arbitrarily referred to as operation panel 109 etc.) are operated so as to display EPG, CPU 108 reads out EPG data as to a time zone or a channel which corresponds to an operation of the operation panel 109 etc., from HD 117 by controlling the HD drive 116, and by use of the EPG data, prepares the EPG screen 41 (FIG. 2) in a predetermined format. Further, CPU 108 supplies the EPG screen 41 to the OSD section 103A which is incorporated in the video decoder 103, through the bus. The OSD section 103A overlaps the EPG screen 41 from CPU 108, with a decoded result of the video recorder 103, according to need, and outputs it from the video output terminal 105. By this means, in the TV receiver 13 (FIG. 1) which was connected to the video output terminal 105, the EPG screen 41 is displayed as shown in FIG. 2.

For example, a user A, who is at home in the user A's home, can make a recording reservation of a desired program, over taking a look at the EPG screen 41. That is, when the user A operates the operation panel 109 etc. so as to specify a desired program on the EPG screen 41 and make a recording reservation thereof, CPU 108 reads out program information (channel, broadcast date, broadcast starting time, broadcast ending time, title, explanation of a content of a program) of a reservation target program from the EPG data recorded in HD 117 by controlling the HD drive 116, and by use of the program information, prepares a setup screen for setting up program recording information which is necessary for reserved recording of the reservation target program.

Then, CPU 108 supplies the setup screen to the TV receiver 103 through the bus, the OSD section 103A, and the video output terminal 105, and by this means, in the TV receiver 103, the setup screen is displayed.

Here, the setup screen is configured in the same manner as, for example, the reservation screen 53 which was explained in FIG. 3. Therefore, the setup screen has a "date" column, a "time" column, a "channel" column, a "recording mode" column, an "extension" column, and a "protect" column, and in the "date" column, the "time" column, the "channel" column, the "recording mode" column, the "extension" column and the "protect" column, default information, which was explained in the reservation screen 53, is set up.

In case that a user A desires a recording reservation of a reservation target program with a content displayed on the setup screen, the operation panel 109 etc. are operated so as to fix its recording reservation. When the operation panel 109 etc. are operated so as to fix the recording reservation, reservation processing is carried out in DVR 12, by using information which is set up (displayed) on the setup screen at that time, as program recording information which is necessary for reserved recording of the reservation target program.

FIG. 8 is a flow chart explaining reservation processing which is carried out by DVR 12.

CPU 108 carries out, in a step S11, judgment of whether or not the reservation target program is not overlapped with recording of another program, with reference to program recording information of the reservation target program, and program recording information which has been registered in a reservation list stored (recorded) in HD 117.

That is, the reservation list is a list of programs for which reservations of recording were fixed, and a list in which program recording information of the programs is registered, and in the step S11, it is judged whether or not a broadcast time zone of a reservation target program is not overlapped with a broadcast time zone of a program, program recording information of which has been already registered in the reservation list.

In the step S11, in case of being judged that the broadcast time zone of the reservation target program is overlapped with the broadcast time zone of the program, program recording information of which has been already registered in the reservation list, it proceeds on to a step S12, since it is not possible to carry out recording of such two programs that broadcast time zones are overlapped even partially, at the same time, and CPU 108 has the TV receiver 13 displayed such an overlap message that broadcast time zones are overlapped, by controlling the OSD section 103A, and completes reservation processing. Therefore, in this case, a recording reservation of the reservation target program is not made.

On one hand, in the step S11, in case that the broadcast time zone of the reservation target program is not overlapped with the broadcast time zone of the program, program recording information of which has been already registered in the reservation list, it proceeds on to a step S13, and CPU 108 carries out recording reservation processing in which program recording information of the reservation target program is (added) registered to the reservation list which has been recorded in HD 117, and by this means, completes a recording reservation of the reservation target program to finish the reservation processing.

As above, program recording information of a program for which reserved recording is carried out, is registered in the reservation list. Therefore, it can be said that the reservation list is reservation status information relating to a reservation status of recording of a program.

Here, in the embodiment of FIG. 5, DVR 12 was configured so as to have only one tuner section 101, and therefore, it is not possible to record two programs which is overlapped with a broadcast time zone, at the same time, but in case that DVR 12 has a plurality of tuner sections, it is possible to record programs of the number of the tuner sections at the same time.

In addition, in the reservation processing of FIG. 8, it is configured so as not to make a recording reservation of a reservation target program, in case that a broadcast time zone of a reservation target program is overlapped with a broadcast time zone of a program, program recording information of which has been already registered in the reservation list, but besides it, for example, it is possible to make a recording reservation of a reservation target program by canceling a recording reservation of a program (this is hereinafter referred to as an overlap program arbitrarily), a broadcast time zone of which is overlapped with that of the reservation target program, among programs, program recording information of which has been already registered in the reservation list, i.e., to additionally register program recording information of the reservation target program, by deleting program recording information of the overlapped program, in the reservation list. Meanwhile, it is desirable that the recording reservation of the overlapped program is canceled and a recording reservation of the reservation target program is made, for example after confirmation is obtained from a user.

Next, CPU 108 of DVR 12 is monitoring current time (date and hour) and when the current date and hour become (right before) broadcast starting time of a program, program recording information of which has been registered in the reservation list of HD 117, reserved recording processing for carrying out reserved recording of the program is carried out in DVR 12.

That is, FIG. 9 is a flow chart which explains reserved recording processing that DVR 12 carries out.

In DVR 12, when current time becomes broadcast starting time in program recording information which has been registered in the reservation list, its recording is carried out in a step S21, by using a program which is specified by its program recording information as a recording target program.

That is, in the step S21, CPU 108 controls the tuner section 101 and the demultiplexer 102, so as to be able to obtain packets of the recording target program, with reference to a channel etc. in program recording information of a recording target program which has been registered in the reservation list, and by this means, the demulltiplexer 102 outputs packets of the recording target program on the bus. The packets of the recording target program, which were outputted on the bus, are supplied to the HD drive 116, and recorded in HD 117 which is incorporated therein. By doing things as above, recording of a recording target program is carried out.

Then, CPU 108, when current time becomes broadcast ending time in the program recording information of the recording target program, controls the tuner section 101, the demultiplexer 102, and the HD drive 116, to terminate processing for recording, and it proceeds on from the steps S21 to S22.

Meanwhile, here, it is configured so as to carry out recording of a recording target program from broadcast starting time until broadcast ending time, but as to a recording target program, it is possible to configure so as to start recording from earlier time by only first time than the broadcast starting time and to end recording at later time by only second time than the broadcast ending time. The first and second time can be set as default fixed time, and can be also set as time which can be set up by a user.

In the step S22, CPU 108 registers program recording information of a recording target program in a recorded list which is stored (recorded) in HD 117.

That is, the recorded list is a list of programs, data (packet) of which has been recorded in HD 117 (recorded programs), and a list in which program recording information of the programs is registered, and in the step S22, program recording information of a recording target program for which recording was completed (program which was a recording target program (recorded program)) is registered in the recorded list.

After that, it proceeds on from the step S22 to S23, and CPU 108 deletes program recording information of a recording target program for which recording was completed, from a reservation list which has bee stored in HD 117, and completes reservation recording processing.

Meanwhile, in DVR 12, a reservation list and a recorded list, which have been stored in HD 117, can be outputted to and displayed on the TV receiver 13 through the OSD section 103A and the video output terminal 105, for example, in response to an operation of the operation panel 109 etc.

A user A can carry out canceling of a recording reservation, deletion of (data of) a recorded program, and so on, with reference to the reservation list and the recorded list which were displayed on the TV receiver 13.

That is, when a user A selects program recording information of a program for which a recording reservation is about to be deleted, in the reservation list which was displayed on the TV receiver 13 and operates the operation panel 109 etc. so as to delete the recording reservation, CPU 108 deletes corresponding program recording information, from the reservation list which has been stored in HD 117. Further, when a user A selects program recording information, a content of which is about to be changed, in the reservation list which was displayed on the TV receiver 13 and operates the operation panel 109 etc. so as to change the content, CPU 108 changes program recording information in the reservation list which has been stored in HD 117, in response to the operation. Concretely speaking, a channel, broadcast starting time, broadcast ending time, a recording mode, protect information etc. in program recording information are changed.

In addition, when a user A selects program recording information of a program which is about to be deleted (recorded program), in the recorded list which was displayed on the TV receiver 13 and operates the operation panel 109 etc. so as to delete the program, CPU 108 deletes corresponding program recording information from the recorded list which has been stored in HD 117, and also deletes (data of) a corresponding program from HD 117.

As above, the reservation list and the recorded list can be edited by such a matter that a user A operates the operation panel 109 etc.

Next, in HD 117 of DVR 12, a web server program has been installed, and CPU 108 executes the web server program so that DVR 12 functions as a web server.

Figure 10:
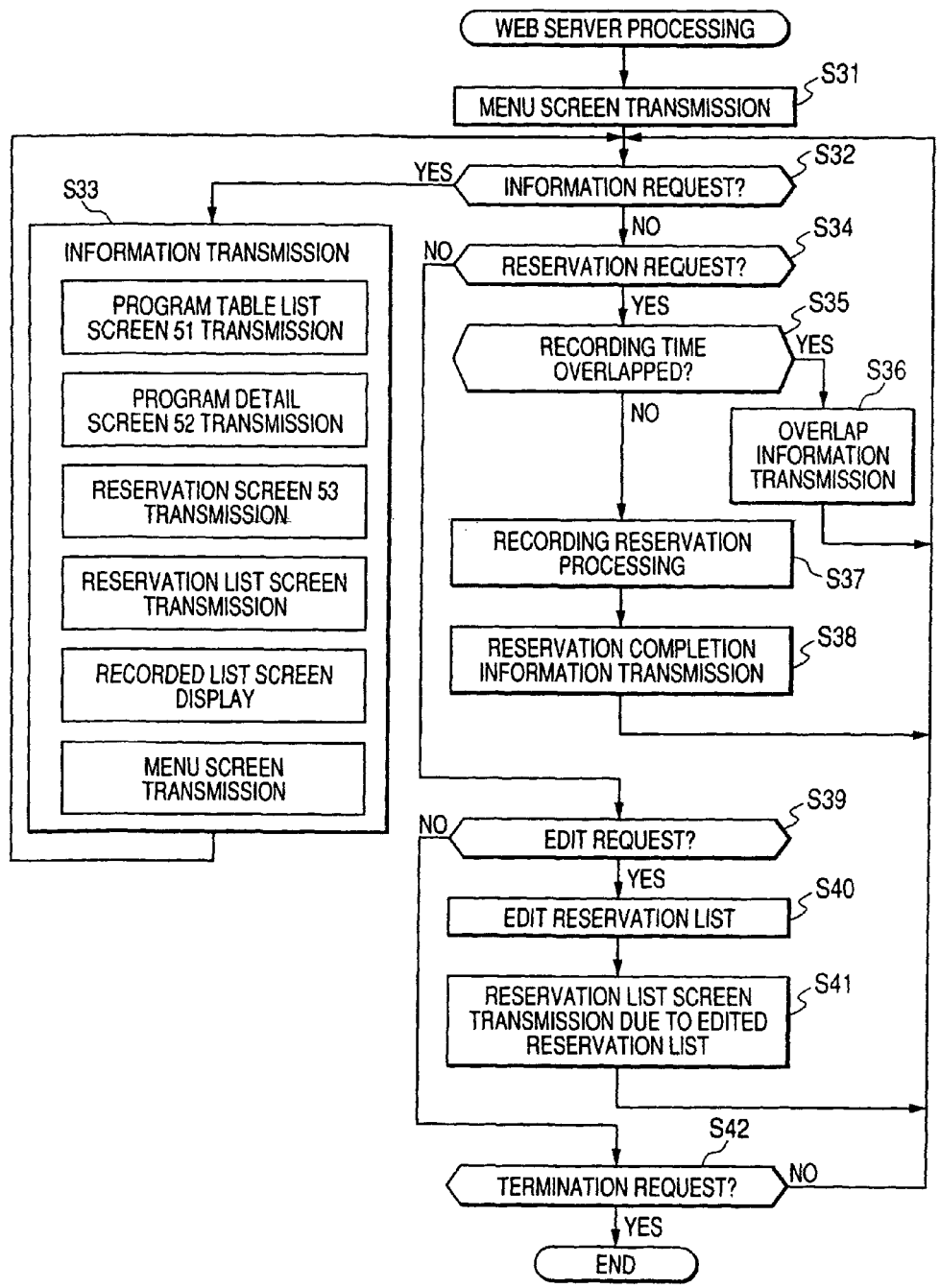
FIG. 10 is a flow chart which explains web server processing.

FIG. 10 is a flow chart which explains web server processing which is carried out by DVR 12 as a web server.

For example, when a user A at a place where one is away from home operates the portable telephone 31 so as to access to DVR 12, the portable telephone 31 transmits a request of a predetermined menu screen which is a web page, to DVR 12, through the base station 22 (FIG. 1), the network 21, and the router 14. In DVR 12, the communication I/F 107 receives the menu screen request from the portable telephone 31 and supplies it to CPU 108.

CPU 108, when the menu screen request is supplied from the communication I/F 107, has the communication I/F 107 transmitted the predetermined menu screen which is a web page, in a step S31. By this means, the menu screen is transmitted from the communication I/F 107 to the portable telephone 31 through the router 14 (FIG. 1), the network 21, and the base station 22. In the portable telephone 31, the menu screen is received and displayed on the display 32.

Here, in the menu screen, for example, a button for requesting EPG, a button form requesting a reservation list, a button for requesting a recorded list (alternately, display of icons, hyper links etc.) and so on are disposed.

CPU 108, after it had the communication I/F 107 transmitted the menu screen in the step S31, proceeds on to a step S32, and judges whether or not there was a request of any information from the portable telephone 31.

In the step S32, in case that it was judged that there was the request of any information from the portable telephone 31, i.e., in case that a user A operates the portable telephone 31 so as to request any information (e.g., clicks a hyper link to EPG, a reservation list and a recorded list) and the request of the information is transmitted from the portable telephone 31 and received by the communication I/F 107, it proceeds on to a step S33, and CPU 108 has the communication I/F 107 transmitted information which was requested, and it returns to the step S32.

That is, in case that an information request from the portable telephone 31 is one which requests the program table list screen 51 and the program detail screen 52 which were explained in FIG. 3, CPU 108 prepares the program table list screen 51 and the program detail screen 52 which are web pages, from EPG data which has been recorded in HD 117, and has the communication I/F 107 transmitted them to the portable telephone 31. In the portable telephone 31, the program table list screen 51 and the program detail screen 52, which are transmitted from the communication I/F 107, are received and displayed on the display 32.

In addition, in case that the information request from the portable telephone 31 is one which requests the reservation list or the recorded list, CPU 108 prepares a reservation list screen or a recorded list screen which is a web page of the reservation list or the recorded list, from the reservation list or the recorded list which has been stored in HD 117, and has the communication I/F 107 transmitted it to the portable telephone 31. In the portable telephone 31, the reservation list screen or the recorded list screen, which is transmitted from the communication I/F 107, is received and displayed on the display 32.

Further, in case that the information request from the portable telephone 31 is one which requests a menu screen, CPU 108 has the communication I/F 107 transmitted the menu screen, in the same manner as the case in the step S31. The menu screen is received by the portable telephone 31, and displayed on the display 32.

Here, in case that the reservation list screen or the recorded list screen is displayed on the display 32 in the portable telephone 31, a user A operates the operating section 33 of the portable telephone 31, so as to edit the reservation list screen or the recorded list screen, and thereby, it is possible to edit the reservation list or the recorded list which was stored in HD 117 of DVR 12, in the same manner as such a case that the operation panel 109 etc. of DVR 12 was operated. Editing of the reservation list and the recorded list by an operation of the operating section 33 of the portable telephone 31 will be described later.

On one hand, in the step S32, in case that it was judged that there was no information request from the portable telephone 31, it proceeds on to a step S34, and CPU 108 judges whether or not there was a reservation request for requesting a recording reservation of a program from the portable telephone 31.

That is, as described in FIG. 3, when a user A desires a recording reservation of a reservation target program with a content on a reservation screen 53, in case that the reservation screen 53 is displayed on the display 32 in the portable telephone 31 and operates the operating section 33 of the portable telephone 31 so as to fix the recording reservation, the portable telephone 31 transmits information which is set up (displayed) on the reservation screen 53 to DVR 12 as program recording information which is necessary for reserved recording of a reservation target program, together with a reservation request which is a request of a recording reservation. In the step S34, it is judged whether or not there was the suchlike reservation request.

In the step S34, in case that it was judged that there was the reservation request from the portable telephone 31, i.e., in case that the reservation request and program recording information are transmitted from the portable telephone 31 and received by the communication I/F 107 and further, the reservation request and program recording information are supplied to CPU 108, it proceeds on to a step S35.

In the step S35, CPU 108 judges whether or not a program for which a recording reservation is requested by the reservation request from the portable telephone 31 (this is also hereinafter referred to as a reservation target program arbitrarily) is overlapped with recording of another program, in the same manner as the case in the step S11 of FIG. 8.

That is, in the step S35, CPU 108 recognizes a broadcast time zone (from recording starting time until recording ending time) (including date) of a reservation target program, on the basis of program recording information which is transmitted together with the reservation request from the portable telephone 31, and judges whether or not the broadcast time zone of the reservation target program is overlapped with a broadcast time zone of a program, program recording information of which has been already registered in a reservation list which has been stored in HD 117.

In the step S35, in case that it was judged that the broadcast time zone of the reservation target program is overlapped with the broadcast time zone of the program, program recording information of which has been already registered in the reservation list, it proceeds on to a step S36, since it is not possible to carry out recording of such two programs that broadcast time zones are overlapped even partially, at the same time, and CPU 108 has the communication I/F 107 transmitted such a message that broadcast time zones are overlapped, to the portable telephone 31, and it returns to the step S32.

Overlap information, which was transmitted from the communication I/F 107, is received by the portable telephone 31, and displayed on the display 32. By this means, a user A, who possesses the portable telephone 31, can recognize that one has to give up recording of a reservation target program, or that one can not make a recording reservation of the reservation target program, unless program recording information of a program, a broadcast time zone of which is overlapped with that of the reservation target program, is deleted from a reservation list (unless a recording reservation of the program is canceled).

In addition, in the step S35, in case that it was judged that the broadcast time zone of the reservation target program is not overlapped with the broadcast time zone of the program, program recording information of which has been already registered in the reservation list, it proceeds on to a step S37, and CPU 108 carries out recording reservation processing, targeting the reservation target program. That is, in the step S37, in the same manner as the case in the step S13 of FIG. 8, CPU 108 registers program recording information of the reservation target program in the reservation list which has been stored in HD 117, and it proceeds on to a step S38.

In the step S38, CPU 108 has the communication I/F 107 transmitted reservation completion information which is such a message that a recording reservation of a reservation target program was completed, to the portable telephone 31, and it returns to the step S32.

The reservation completion information, which was transmitted from the communication I/F 107, is received by the portable telephone 31, and displayed on the display 32. By this means, a user A, who possesses the portable telephone 31, can recognize that the recording reservation of the reservation target program was completed.

On one hand, in the step S34, in case that it was judged that there was no reservation request from the portable telephone 31, it proceeds on to a step S39, and CPU 108 judges whether or not there was an editing request for requesting to carry out editing of the reservation list, from the portable telephone 31.

That is, when a user A operates the operating section 33 of the portable telephone 31 so as to edit a reservation list screen in case that the reservation list screen is displayed on the display 32 in the portable telephone 31, the portable telephone 31 transmits an editing request for requesting editing of the reservation list, to DVR 12, in response to the operation. In the step S39, it is judged whether or not there was the suchlike editing request.

In the step S39, in case that it was judged that there was the editing request from the portable telephone 31, i.e., in case that the editing request is transmitted from the portable telephone 31 and received by the communication I/F 107 and further, supplied to CPU 108, it proceeds on to a step S40.

In the step S40, CPU 108 edits the reservation list which was stored in HD 117, depending on the editing request from the portable telephone 31, and it proceeds on to a step S41. In the step S41, CPU 108 prepares a reservation list screen which is a web page of the reservation list, from the edited reservation list, and has the communication I/F 107 transmitted it to the portable telephone 31, and it returns to the step S32. In the portable telephone 31, the reservation list screen, which is transmitted from the communication I/F 107, is received, and by this means, on the display 32, the reservation list screen, which corresponds to the edited reservation list, is displayed.

Meanwhile, here, the case of carrying out editing of the reservation list was explained, but it is also possible to carry out editing of a recorded list.

That is, when a user A operates the operating section 33 of the portable telephone 31 so as to edit a recorded list screen, in case that the recorded list screen is displayed on the display 32 in the portable telephone 31, the portable telephone 31 transmits an editing request for requesting editing of the recorded list to the DVR 12 in response to the operation.

In DVR 12, the editing request of the recorded list from the portable telephone 31 is received by the communication I/F 107. In this case, CPU 108 edits the recorded list which was stored in HD 117, in response to the editing request from the portable telephone 31, and prepares a recorded list screen which is a web page of the recorded list, from the edited recorded list, and has the communication I/F 107 transmitted it to the portable telephone 31. In the portable telephone 31, the recorded list screen, which is transmitted from the communication I/F 107, is received, and by this means, on the display 32, the recorded list screen, which corresponds to the edited recorded list, is displayed. Meanwhile, in case that the editing request of the recorded list is a request for deleting a program, CPU 108 deletes program recording information which corresponds to the program, from the recorded list, and in addition, deletes (data of) a corresponding program, from HD 117.

On one hand, in the step S39, in case that it was judged that there was no editing request, it proceeds on to a step S42, and CPU 108 judges whether or not there was a termination request for requesting termination of communication, from the portable telephone 31.

That is, when a user A operates the operating section 33 of the portable telephone 31, so as to terminate communication with DVR 12, in the portable telephone 31, the portable telephone 31 transmits a termination request to DVR 12 in response to the operation. In the step S42, it is judged whether there was the suchlike termination request.

In the step S42, in case that it was judged that there was no termination request from the portable telephone 31, it returns to the step S32, and hereinafter, the same processing is repeated.

In addition, in the step S42, in case that it was judged that there was the termination request from the portable telephone 31, i.e., in case that the termination request is transmitted from the portable telephone 31 and the termination request is received by the communication I/F 107 and supplied to CPU 108, (CPU 108 of) DVR 12 terminates web server processing.

Next, a program of a web browser (client) has been installed in EEPROM 204 of the portable telephone 31 (FIG. 6), and CPU 201 executes the program of the web browser so that the portable telephone 31 functions as the web browser.

Figure 11:
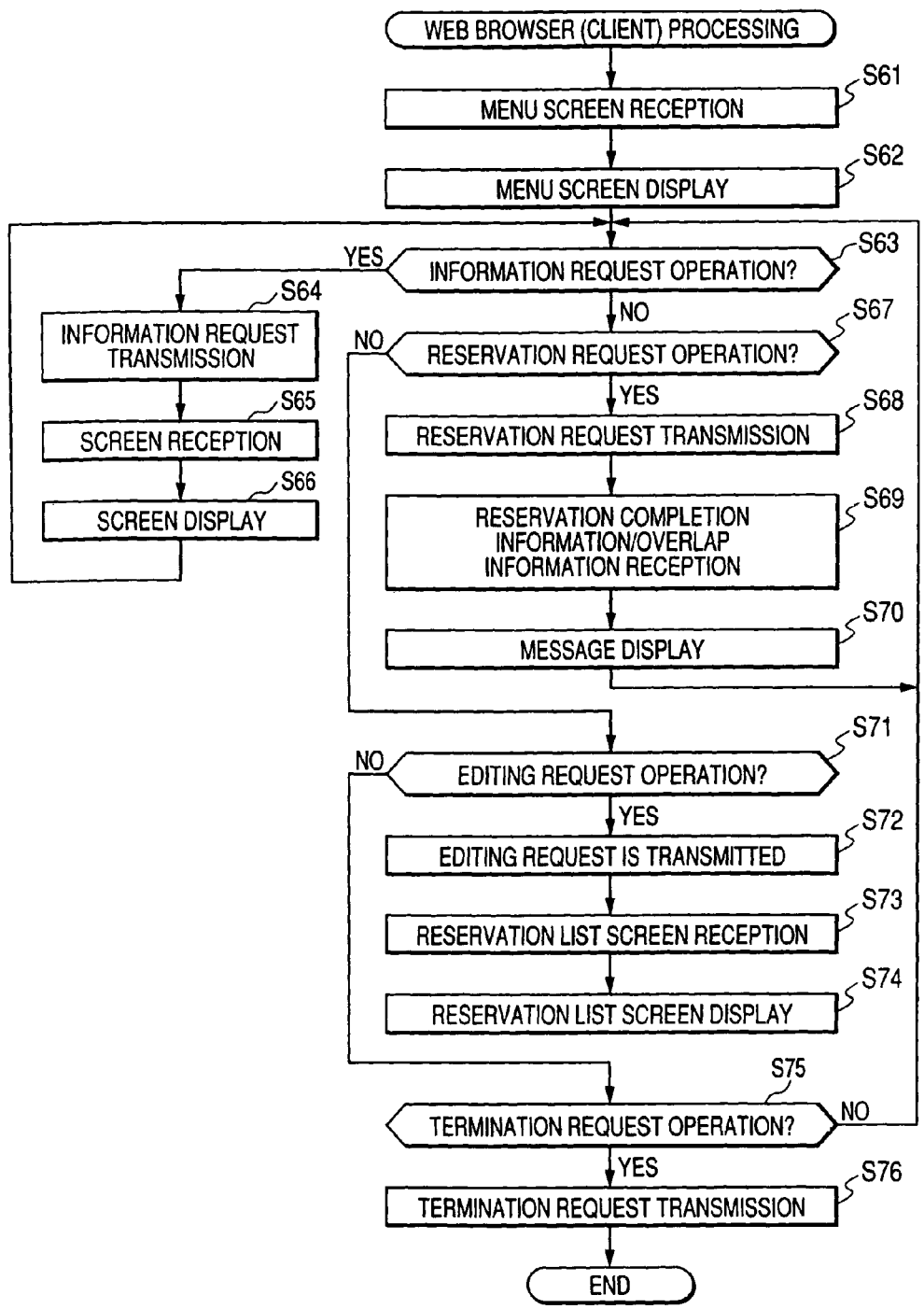
FIG. 11 is a flow chart which explains web browse processing.

FIG. 11 is a flow chart which explains web browser processing which is carried out by the portable telephone 31 as a web browser.

For example, when a user A at a place where one is away from home operates the operating section 33 of the portable telephone 31 so as to access to DVR 12, CPU 201 starts execution of the web browser program, and has firstly the modem circuit section 258 transmitted a request of a menu screen to DVR 12 through the transmitting/receiving circuit section 262, the antenna 214, the base station 22 (FIG. 1), the network 21, and the router 14.

DVR 12, when it receives the menu screen request from the portable telephone 31, transmits the menu screen to the portable telephone 31 as explained in the step S31 of FIG. 10, and therefore, the transmitting/receiving circuit section 262 and the modem circuit section 258 of the portable telephone 31 receive the menu screen through the antenna 214 in a step S61, and supplies it to CPU 201, and it proceeds on to a step S62. In the step S62, CPU 201 supplies the menu screen from DVR 12 to the display control section 255, and by this means, displays the menu screen on the display 32, and it proceeds on to a step S63.

Here, as explained in FIG. 10, on the menu screen, for example, hyper links to EPG, a reservation list and a recorded list, and so on are disposed.

In the step S63, CPU 201 judges whether or not a user A operated the operating section 33, so as to request for any information.

In the step S63, in case that it was judged that the operating section 33 was operated so as to request for information, i.e., for example in case that a user A operates the operating section 33 and thereby, clicked hyper links to EPG, the reservation list and the recorded list, and it proceeds on to a step S64, and CPU 201 has the modem circuit section 258 and the transmitting/receiving section 262 transmitted a request of information which corresponds to the operation of the operating section 33. Here, in the request of information which corresponds to the operation of the operating section 33, for example, URL (Uniform Resource Locator) which specifies the information, and so on are included.

DVR 12, when it receives the request of information from the portable telephone 31, transmits information which corresponds to the request of information, as explained in the step S33 of FIG. 10, i.e., web pages such as the program table list screen 51, the program detail screen 52, the reservation list screen, the recorded list screen, and the menu screen, and therefore, the transmitting/receiving circuit section 262 and the modem circuit section 258 of the portable telephone 31 receive information from DVR 12 in the step S65, and supplies it to CPU 201, and it proceeds on to a step S66. In the step S66, CPU 201 supplies the information from DVR 12 to the display 32 through the display control section 255, and it returns to the step S63. By this means, on the display 32, in lieu of a previous screen, the program table list screen 51, the program detail screen 52, the reservation list screen, the recorded list screen, or the menu screen is displayed.

In addition, in the step S63, in case that it was judged that the operating section 33 is not operated so as to request for information, it proceeds on to a step S67, and CPU 201 judges whether a user A operated the operating section 33 so as to request for recording reservation of a program.

That is, in the step S67, as explained in FIG. 3, it is judged whether a user A desired a recording reservation of a reservation target program with a content on a reservation screen 43 and operated the operating section 33 of the portable telephone 31 so as to fix the recording reservation, in case that the reservation screen 53 of FIG. 3 is displayed on the display 32 in the portable telephone 31.

In the step S67, in case that it was judged that the operating section 33 was operated so as to request for recording reservation of a program, i.e., in case that the operating section 33 was operated so as to fix the recording reservation of a reservation target program with a content on the reservation screen 43, CPU 201 supplies information which is set up (displayed) on the reservation screen 53, to the transmitting/receiving circuit section 262 through the modem circuit section 258, as program recording information which is necessary for reserved recording of a reservation target program, together with the reservation request, and it proceeds on to a step S68. In the step S68, the transmitting/receiving circuit section 262 transmits the reservation request and program recording information from CPU 201, to DVR 12, through the antenna 214.

DVR 12, in case that it received the reservation request from the portable telephone 31, transmits overlap information or reservation completion information as a message, as explained in the steps S36 and S38 of FIG. 10, and therefore, the transmitting/receiving circuit section 262 waits for such a matter that overlap information or reservation completion information is transmitted from DVR 12, and then, it proceeds on from the step S68 to S69, and the overlap information or reservation completion information from DVR 12 is received through the antenna 214, and supplied to CPU 201 through the modem circuit section 258, and it proceeds on to a step S70.

CPU 201, in the step S70, supplies the overlap information or reservation completion information from DVR 12, to the display 32 through the display control section 255, and by this means, displays the overlap information or reservation completion information on the display 32, and it returns to the step S63.

As above, on the display 32, the overlap information or reservation completion information is displayed, and therefore, a user A can recognize that there exists a program, a broadcast time zone of which is overlapped with that of a reservation target program, and that a recording reservation of a reservation target program was completed.

On one hand, in the step S67, in case that it was judged that the operating section 33 is not operated so as to request for recording reservation of a program, it proceeds on to a step S71, and CPU 201 judges whether or not a user A operated the operating section 33 so as to request for editing of a reservation list.

That is, in the step S71, it is judged whether or not the reservation list screen is displayed on the display 32 in the portable telephone 31, it is judged whether or not a user A operated the operating section 33 of the portable telephone 31, so as to edit the reservation list screen.

In the step S71, in case that it was judged that the operating section 33 was operated so as to edit the reservation list screen, it proceeds on to a step S72, and CPU 201 supplies an editing request for requesting editing of the reservation list in response to the operation, to the transmitting/receiving circuit section 262 through the modem circuit section 268, and by this means, transmits the editing request to DVR 12 through the antenna 214.

DVR 12, in case that it received the editing request for requesting editing of the reservation list from the portable telephone 31, edits the reservation list which has been stored in HD 117, in response to the editing request, as explained in the steps S40 and S41 of FIG. 10, and prepares the reservation list screen from the edited reservation list and transmits it, and therefore, the transmitting/receiving circuit section 262 waits for such a matter that the edited reservation list screen is transmitted from DVR 12, and then, it proceeds on from the step S72 to S73, and the edited reservation list screen from DVR 12 is received through the antenna 214, and supplied to CPU 201 through the modem circuit section 258, and it proceeds on to a step S74.

CPU 201, in the step S74, supplies the edited reservation list screen from DVR 12 to the display 32 through the display control section 255, and by this means, displays the edited reservation list screen on the display 32, and it returns to the step S63.

Meanwhile, it is also possible to carry out editing of a recorded list, from the portable telephone 31, in addition to editing of the reservation list of DVR 12.

That is, when a user A operates the operating section 33 of the portable telephone 31, so as to edit a recorded list screen, in case that the recorded list screen is displayed on the display 32 in the portable telephone 31, the portable telephone 31 transmits an editing request for requesting editing of the recorded list, to DVR 12, in response to the operation.

DVR 12, in case that it received an editing request of a recorded list from the portable telephone 31, edits the recorded list which was stored in HD 117, in response to the editing request, as explained in FIG. 10, and prepares a recorded list screen, from the edited recorded list, and transmits it to the portable telephone 31. In the portable telephone 31, the edited recorded list screen from DVR 12 is received, and displayed on the display 32.

On one hand, in the step S71, in case that it was judged that the operating section 33 is not operated so as to edit a reservation list screen, it proceeds on to a step S75, and CPU 201 judges whether or not a user A operated the operating section 33 so as to terminate communication with DVR 12.

In the step S75, in case that it was judged that the operating section 33 is not operated so as to terminate communication with DVR 12, it returns to the step S63, and hereinafter, the same processing is repeated.

In addition, in the step S75, in case that it was judged that the operating section 33 was operated so as to terminate communication with DVR 12, i.e., for example in case that a user operated the operating section 33 so as to terminate a web browser, it proceeds on to a step S76, and CPU 201 supplies a termination request for requesting termination of communication, to the transmitting/receiving circuit section 262 through the modem circuit section 268, and by this means, has DVR 12 transmitted the termination request through the antenna 214, to terminate web browser processing.

As above, in DVR 12, EPG data, a reservation list as reservation status information relating to a reservation status of program recording, and furthermore, a recorded list relating to a recorded program are stored, and by communicating with the portable telephone 31, the program table list screen 51 (FIG. 3) which was prepared from EPG data, a reservation list screen which was prepared from the reservation list, and a recorded list screen which was prepared from the recorded list are transmitted, in response to a request from the portable telephone 31, whereas in the portable telephone 31, by communicating with DVR 12, requests of the program table list screen 51, the reservation list screen, and the recorded list screen are transmitted in response to an operation of a user, and in response to the request, the program table list screen 51, the reservation list screen and the recorded list screen, which are transmitted from DVR 12, are received and presented, and therefore, it is possible to effectively utilize information that DVR 12 has, and by this means, provision of highly convenient DVR 12 etc. become possible.

That is, the portable telephone 31, by communicating with DVR 12, presents the program table list screen 51 which was prepared from EPG data recorded in the DVR 12, to a user A, and therefore, it is possible to browse the program table list screen 51 as the latest EPG by EPG data which has been recorded in DVR 12. Further, since a user A browses EPG from a place where one is away from home, there is no need to access to an EPG server, and therefore, there is also no need to install the EPG server.

In addition, a user A can browse the reservation list screen and the recorded list screen as a status (presence) of DVR 12 from a place where one is away from home, and therefore, for example, it becomes possible to prevent a useless recording reservation like making a recording reservation again, as to a program which was already reserved for recording.

Further, in the portable telephone 31, a reservation request for requesting a recording reservation of a program, and an editing request for requesting editing of a reservation list etc. are transmitted in response to an operation of a user, and in DVR 12, the reservation request and the editing request are received from the portable telephone 31, and recording reservation processing and editing of a reservation list etc. are carried out in response to the reservation request and editing request, and therefore, a user A can operate DVR 12, so to speak, directly from a place where one is away from home, and it is possible to improve convenience of DVR 12.

Next, in the above-described case, for ease of explanation, the portable telephone 31 has recognized in advance a method of NAT traversal of the router 14, but we can not say that it is preferable for the portable telephone 31 to preliminarily recognize the method of NAT traversal of the router 14 from the viewpoint of security. In addition, there is such a case that an IP address of WAN side of the router 14 (global IP address) is not fixed but variable.

Figure 12:
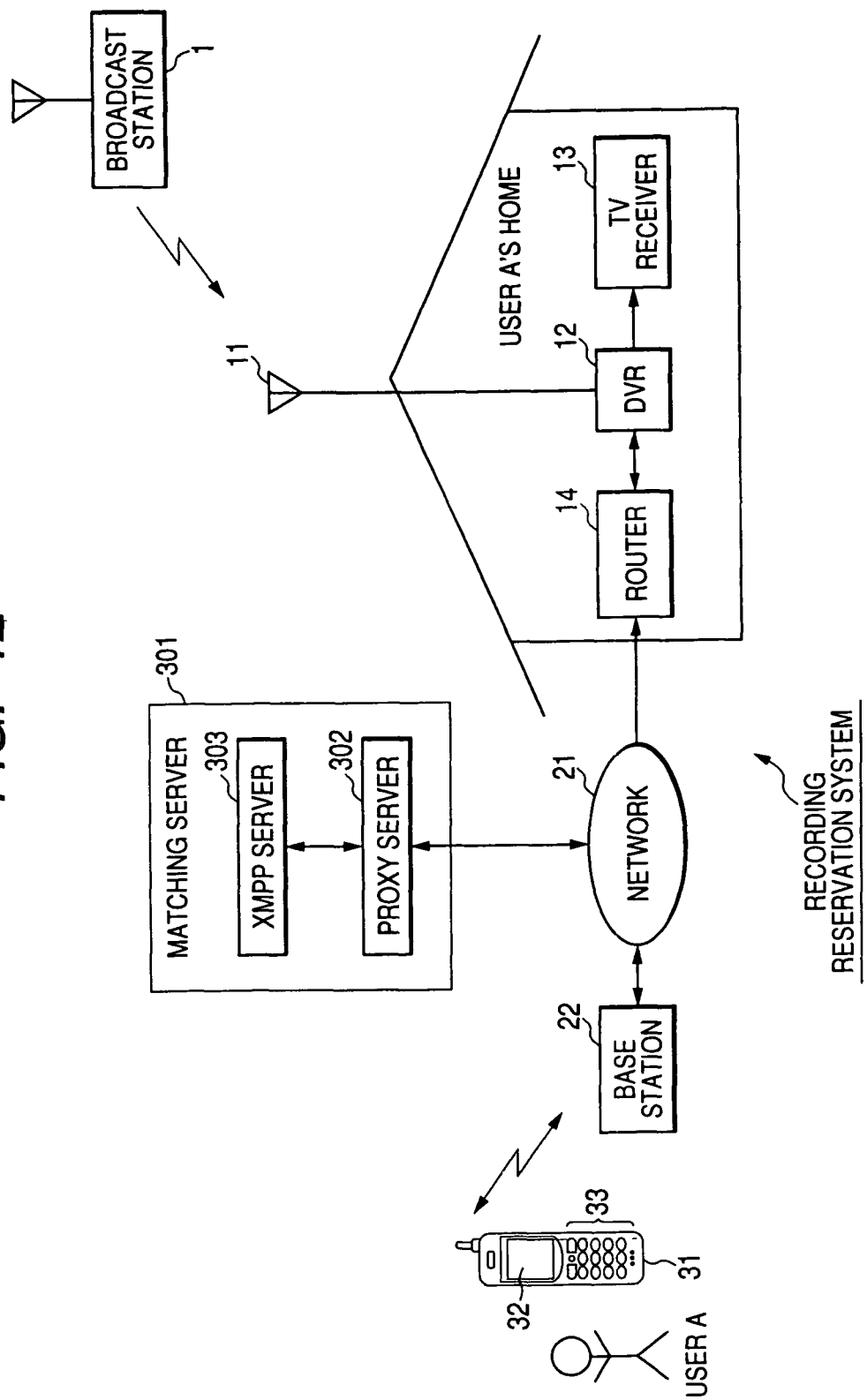
FIG. 12 is a view which shows a configuration example of another embodiment of the recording reservation system to which the invention was applied.

Then, FIG. 12 shows a configuration example of another embodiment of a recording reservation system to which the invention was applied. Meanwhile, in the figure, identical reference numerals and signs are given to portions which correspond to those of the case in FIG. 1, and in the following, their explanations will be arbitrarily omitted. That is, the recording reservation system of FIG. 12 is configured in the same manner as the case in FIG. 1, except that a matching server 301 is newly connected to the network 21.

The matching server 301 is composed of a proxy server 302 and a XMPP (extensible Messaging and Presence Protocol) server 303.

The proxy server 302 carries out access control etc. to the XMPP server 303 through the network 21. The XMPP server 303 provides, by XMPP, a service for enabling the portable telephone 31 and DVR 12 to carry out message (data) exchange, through the network 21 which is Internet, so to speak, directly.

Next, with reference to FIG. 13, operations of DVR 12, the router 14, the portable telephone 31, and the matching server 301 of FIG. 12 will be described.

For example, a user A, after purchase of DVR 12, operates its operation panel 109 (FIG. 5) etc., to register ID (Identification) and password in the matching server 301. That is, for example, a membership card, on which ID and password were described, is supplied with DVR 12, and a user A, by operating the operation panel 109 etc., inputs ID and password which were described on the membership card, to DVR 12.

DVR 12 stores (records) the ID and password, which were inputted by such a matter that a user A operates the operation panel 109 etc., for example in EEPROM 113 (or HD 117), and further, in a step S101, transmits them from the communication I/F 107 to the matching server 301 through the router 14 and the network 21. In the matching server 301, in a step S121, the XMPP server 303 receives and stores the ID and password which are transmitted from DVR 12, and by this means, ID and password of DVR 12 are registered.

After that, DVR 12 transmits the ID and password which were stored in EEPROM 113 in the step S102, to the matching server 301 together with a log-in request, from the communication I/F 107 through the router 14 and the network 21 to carry out log-in (log on), and further, notifies an IP address which has been allocated to the WAN side of the router 14 (global IP address), by transmitting it to the matching server 301.

The XMPP server 303 of the matching server 301 receives the log-in request from DVR 12, and ID and password, in a step S122, and in case that the ID and password coincide with ID and password of DVR 12 which were registered in the step S121 (in case that they coincide with any one of ID and password which have been registered in the XMPP server 303), permits log-in of DVR 12. Further, in the step S122, the XMPP server 303 of the matching server 301 receives an IP address of the router 14 which is transmitted from DVR 12 after permission of log-in, and stores it in association with ID and password of DVR 12.

Meanwhile, DVR 12 logs off from the matching server 301, for example when statuses of DVR 12 and the router 14 are changed, and thereafter, logs on again, and notifies an IP address of the router 14. Here, as such a case that a status of DVR 12 was changed, there is such a case that, for example when DVR 12 has a function as a game machine, use as a game machine was terminated. Further, as such a case that a status of DVR 12 was changed, there is such a case that, for example when DVR 12 can reproduce DVD as the disk 115, reproduction of DVD was terminated. In addition, as such a case that a status of the router 14 was changed, there is such a case that, for example, an IP address, which is allocated to the router 14, was changed.

After that, in case that a user A, who possesses the portable telephone 31, tries to access to DVR 12 from a place where one is away from home, etc., the user A accesses to the matching server 301 through the base station 22 and the network 21, by operating the operating section 33 of the portable telephone 31, and further, logs on by inputting ID and password.

That is, a user A inputs ID and password, which are identical to those registered in the matching server 301 in the step S101, to the portable telephone 31, by operating the operating section 33 of the portable telephone 31. In this case, the portable telephone 31 requests for log-in of ID and password which were inputted by such a matter that a user A operates the operating section 33, in a step S131, and transmits them to the matching server 301 through the base station 22 and the network 21, together with the log-in request, to log on.

The XMPP server 303 of the matching server 301 receives the log-in request from the portable telephone 31, and ID and password, in a step S123, and in case that the ID and password coincide with ID and password which were registered in the step S121 (in case that they coincide with any one of ID and password which have been registered in the XMPP server 303), permits log-in of the portable telephone 31.

After that, the XMPP server 303 of the matching server 301 transmits a port confirmation message for requesting confirmation of a port which is utilized for communication with the portable telephone 31, to an ID address which has been stored in association with ID and password from the portable telephone 31 which was permitted to log on in the step S123, i.e., to the router 14.

The router 14 receives the port confirmation message from the XMPP server 303, in a step S111, and transmits it to DVR 12. DVR 12 receives the port confirmation message from the router 14, in a step S103.

DVR 12, when it receives the port confirmation message, exchanges necessary information with the router 14, in a step S104, and dynamically opens a port which is utilized for communication with the portable telephone 31, by UPnP (Universal Plug and Play), and it proceeds onto a step S105. In the step S105, DVR 12 notifies socket information which represents a socket for accessing to (the menu screen of) DVR 12, such as a port number and ID address etc. for specifying a port which was opened in the step S104, by transmitting it to the XMPP server 303 of the matching server 301.

The XMPP server 303 of the matching server 301 receives the socket information from DVR 12, in a step S125, and it proceeds on to a step S126, and notifies the socket information, by transmitting it to the portable telephone 31.

The portable telephone 31 receives the socket information from the XMPP server 303, in a step S132, and it proceeds on to a step S133, and accesses to DVR 12 through the router 14, on the basis of the socket information received in the step S132. That is, the portable telephone 31 can carry out communication (Direct Access) with DVR 12, by the socket information, without a server which relays communication between the portable telephone 31 and DVR 12, like the matching server 301, so to speak, directly.

For example, the portable telephone 31 transmits a request of a menu screen to DVR 12, in a step S133, and DVR 12 transmits the menu screen to the portable telephone 31, in response to the request, in a step S106.

Besides, between the portable telephone 31 and DVR 12, the program table list screen 51 (FIG. 3) as EPG, a reservation request, reserved program information, reservation completion information, etc. are exchanged, as explained in FIG. 10 and FIG. 11.

As above, in the portable telephone 31, it is possible to secure security of communication between the portable telephone 31 and DVR 12, by obtaining the socket information of DVR 12 through the XMPP server 303 and accessing to DVR 12 from the portable telephone 31 on the basis of the socket information, and in addition, it is possible to access to DVR 12 from the portable telephone 31, even in case that an IP address of WAN side of the router 14 is variable.

Here, (the XMPP server 303 of) the matching server 301 provides a service for carrying out a relay in order for the portable telephone 31 to obtain (receive) socket information, as described above, but it is possible to charge for provision of this service. This charge may be carried out in the matching server 301, and may be carried out in a carrier company of the portable telephone 31 that a user A possesses, together with call charge.

Meanwhile, in this embodiment, as a program, it is configured to adopt a program which is composed of video data and audio data, but the program may be a program of only audio data, a program of a computer program and other data (program of data broadcast), and so on.

In addition, in this embodiment, it was configured, in the portable telephone 31, to obtain (receive) EPG data (program table list screen 51) from DVR 12, but in the portable telephone 31, it is possible to configure so as to obtain EPG data which is included in digital broadcast waves, by directly receiving digital broadcast waves which are transmitted by the broadcast station 1.

Further, in this embodiment, it was configured so as to access to DVR 12 from the portable telephone 31 which is located outside a user A's home, through the base station 22, the network 21, and the router 14, but in case that a user A stays at user A's home, it is possible to access to DVR 12 from the portable telephone 31 through the router 14, for example by so-called wireless LAN.

In addition, a communication apparatus, which communicates with DVR 12, is not limited to the portable telephone 31, but in addition to that, it may be, for example, PDA (Personal Digital Assistance) having a communication function, a portable type personal computer (so-called notebook personal computer etc.), a desk top type personal computer which is located at a place where one is away from home, and so on.

Further, in DVR 12, it was configured so as to receive and record digital broadcast waves, but DVR 12 may be one which receives and records analog broadcast waves.

In addition, in DVR 12, it was configured so as to record a program in HD 117 or the disk 115, but a recording medium for recording a program may be, for example, a semiconductor memory, a tape-shaped recording medium, in addition to it.

Further, in this embodiment, it was configured so as to display a reservation list and a recorded list, separately from the EGP screen 41 (FIG. 2) which is a screen of EPG and the program table list screen 51 (FIG. 3), but information of the reservation list and the recorded list can be displayed by being overlapped (combined) with the EPG screen 41 and the program table list screen 51. That is, it is possible to display, for example, a mark representing a program which is reserved for recording, and a mark representing a recorded program, on the EPG screen 41 and the program table list screen 51. In this case, a user can recognize a program which is reserved for recording, and a recorded program, by simply taking a look at the EPG screen 41 and the program table list screen 51.

Further, in this specification, there is no need to process a processing step for describing a program for having a computer (processor) executed various processing in chronological order, necessarily along orders which were described as a flow chart, and it includes processing which is executed in parallel or individually (e.g., parallel processing or processing by object).

In addition, a program may be one which is processed by one computer, and may be one which is processed in a distributed manner by a plurality of computers.

Further, it is also possible to carry out processing to be carried out by such a matter that CPU 108 and 201 execute a program, by use of dedicated hardware.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing system, comprising:
a recording apparatus which receives and records a program;
a communication apparatus by which a user communicates with the recording apparatus;
a server which controls initial registering of the recording apparatus and subsequent logging in of the communication apparatus to enable communication thereafter between the recording apparatus and the communication apparatus to be directly carried out without being controlled by the server; and
a router which controls communication between the recording apparatus and the server;
the recording apparatus including:
a first communication unit which transmits, to the server via the router and over a communication network, identification information corresponding to the recording apparatus to register the recording apparatus with the server;

the communication apparatus including:

a second communication unit which receives user-inputted identification information that is inputted into the communication apparatus by the user and transmits, to the server over the communication network, a login request which includes the user-inputted identification information;

the server including:

a third communication unit which receives the identification information corresponding to the recording apparatus transmitted by the first communication unit of the recording apparatus through the router to register the recording apparatus with the server, stores the received identification information corresponding to the recording apparatus, receives the login request transmitted by the second communication unit of the communication apparatus, and compares the identification information included in the login request to the stored identification information corresponding to the recording apparatus, the login request being successful upon the identification information included in the login request coinciding with the stored identification information corresponding to the recording apparatus, whereby the third communication unit of the server, in response to the communication apparatus successfully logging in to the server, transmits a request via the router to the first communication unit of the recording apparatus for access information, wherein the request comprises a port confirmation message for requesting confirmation of a port of the first communication unit to use for direct communication between the recording apparatus and the communication apparatus, receives the access information from the first communication unit of the recording apparatus in response to the request, the access information comprising socket information identifying the port of the first communication unit to be used for the direct communication between the first communication unit of the recording apparatus and the second communication unit of the communication apparatus to be carried out over the communication network without being controlled by the server, and transmits the access information to the second communication unit of the communication apparatus;

the recording apparatus including:

a receiving unit which receives a program and EPG (Electronic Program Guide) data, a storing unit which stores the EPG data and reservation status information which relates to a reservation status of program recording, and a reservation recording processing unit which carries out reservation recording processing in which a program is recorded in accordance with the reservation status information;

the first communication unit of the recording apparatus carrying out the direct communication with the communication apparatus over the communication network through the router using the port of the recording apparatus identified in the socket information of the access information without such communication being controlled by the server that controlled the initial registering of the recording apparatus and the subsequent logging in of the communication apparatus, including transmitting the EPG data or the reservation status information in accordance with a request from the communication apparatus;

the second communication unit of the communication apparatus carrying out the direct communication with the recording apparatus over the communication network through the router using the port of the recording apparatus identified in the socket information of the access information without such communication being controlled by the server that controlled the initial registering of the recording apparatus and the subsequent logging in of the communication apparatus, including transmitting a request of the EPG data or the reservation status information in accordance with an operation of the user and receiving the EPG data or the reservation status information which is transmitted from the recording apparatus in accordance with the request; and the communication apparatus including:

a presenting unit which presents to the user the EPG data or the reservation status information which was received by the second communication unit.

2. The information processing system as set forth in claim 1, wherein the second communication unit in the communication apparatus further transmits a reservation request for requesting reservation of program recording, in accordance with an operation of a user, and as to the recording apparatus, the first communication unit carries out also reception of the reservation request, and it further includes a recording reservation processing unit which carries out recording reservation processing for reserving program recording in accordance with the reservation request.

3. The information processing system as set forth in claim 1, wherein the second communication unit in the communication apparatus further transmits an editing request for requesting editing of the reservation status information in accordance with an operation of a user, and as to the recording apparatus, the first communication unit also carries out reception of the editing request, and it further includes an editing unit which edits the reservation status information in accordance with the editing request.

4. The information processing system as set forth in claim 1, wherein the communication apparatus is a device selected from the group consisting of a portable telephone, a Personal Digital Assistant (PDA) having a communication function, a portable type personal computer, and a desk top type personal computer.

5. The information processing system as set forth in claim 2, wherein the recording apparatus further includes a judgment unit which judges whether the reservation requested program received by the first communication unit overlaps with a program already reserved for recording.

6. The information processing system as set forth in claim 5, wherein in case that it was judged by the judgment unit that the reservation requested program overlaps with the program already reserved for recording, the first communication unit transmits overlap information to the communication apparatus.

7. The information processing system as set forth in claim 6, wherein the second communication unit in the communication apparatus further receives the overlap information, and the presenting unit presents the overlap information received by the second communication unit.

8. A recording apparatus for receiving and recording a program, the recording apparatus comprising:

a communication unit which communicates with an external server over a communication network via a router, transmits identification information corresponding to the recording apparatus to register the recording apparatus with the server by which the server controls subsequent logging in of an external communication apparatus to enable communication thereafter between the recording apparatus and the communication apparatus to be directly carried out without being controlled by the server;

the communication unit, in response to the external communication apparatus successfully logging in to the server over the communication network by transmitting a login request which includes the identification information corresponding to the recording apparatus, receives a request from the server for access information, wherein the request comprises a port confirmation message for requesting confirmation of a port of the communication unit to use for direct communication between the recording apparatus and the communication apparatus, and transmits the access information to the server in response to the request, the access information comprising socket information identifying the port of the communication unit to be used for the direct communication over the communication network to be carried out between the communication unit and the external communication apparatus without such communication being controlled by the server that controlled the initial communication between the recording apparatus and the communication apparatus;

a receiving unit which receives a program and EPG (Electronic Program Guide) data;

a storing unit which stores the EPG data and reservation status information which relates to a reservation status of program recording; and a reservation recording processing unit which carries out reservation recording processing for recording a program in accordance with the reservation status information;

the communication unit carrying out the direct communication with the external communication apparatus over the communication network through the router using the port of the recording apparatus identified in the socket information of the access information without such communication being controlled by the server that controlled the initial registering of the recording apparatus and the subsequent logging in of the communication apparatus, including transmitting the EPG data or the reservation status information in accordance with a request from the external communication apparatus.

9. The recording apparatus as set forth in claim 8, wherein in case that the communication apparatus transmits a reservation request for requesting reservation of program recording in accordance with an operation of a user, the communication unit also carries out reception of the reservation request, and further has a recording reservation processing unit which carries out recording reservation processing for reserving program recording in accordance with the reservation request.

10. The recording apparatus as set forth in claim 8, wherein in case the communication apparatus transmits an editing request for requesting editing of the reservation status information in accordance with an operation of a user, the communication unit also carries out reception of the editing request, and further includes an editing unit which edits the reservation status information in accordance with the editing request.

11. The recording apparatus as set forth in claim 9, further comprising a judgment unit which judges whether the reservation requested program received by the communication unit overlaps with a program already reserved for recording.

12. The recording apparatus as set forth in claim 11, wherein in case it was judged by the judgment unit that the reservation requested program overlaps with the program already reserved for recording, the communication unit transmits overlap information to the external communication apparatus.

13. A method for receiving and recording a program at a recording apparatus, the method comprising:

subsequent logging in of a communication apparatus to enable communication thereafter between the recording apparatus and the communication apparatus to be directly carried out without being controlled by a server;

in response to the communication apparatus successfully logging in to the server over the communication network through a router by transmitting a login request which includes identification information, receiving a request from the server for access information, wherein the request comprises a port confirmation message for requesting confirmation of a port of a communication unit of the recording apparatus to use for direct communication between the recording apparatus and the communication apparatus, and transmitting the access information to the server in response to the request, the access information comprising socket information identifying the port of the communication unit to be used for the direct communication over the communication network to be carried out between the communication unit and the communication apparatus without such communication being controlled by the server that controlled the initial communication between the recording apparatus and the communication apparatus;

receiving a program and EPG (Electronic Program Guide) data;

storing the EPG data and reservation status information which relates to a reservation status of program recording;

carrying out reservation recording processing for recording a program in accordance with the reservation status information; and carrying out the direct communication with the communication apparatus over the communication network through the router using the port of the recording apparatus identified in the socket information of the access information without such communication being controlled by the server that controlled the initial registering of the recording apparatus and the subsequent logging in of the communication apparatus, including transmitting the EPG data or the reservation status information in accordance with a request from the external communication apparatus.

14. A non-transitory recording medium having recorded thereon a computer-readable program for performing a method for receiving and recording a program at a recording apparatus, the method comprising:

subsequent logging in of a communication apparatus to enable communication thereafter between the recording apparatus and the communication apparatus to be directly carried out without being controlled by a server;

in response to the communication apparatus successfully logging in to the server over the communication network through a router by transmitting a login request which includes identification information, receiving a request from the server for access information, wherein the request comprises a port confirmation message for requesting confirmation of a port of a communication unit of the recording apparatus to use for direct communication between the recording apparatus and the communication apparatus, and transmitting the access information to the server in response to the request, the access information comprising socket information identifying the port of the communication unit to be used for the direct communication over the communication network to be carried out between the communication unit and the communication apparatus without such communication being controlled by the server that controlled the initial communication between the recording apparatus and the communication apparatus;

receiving a program and EPG (Electronic Program Guide) data;

storing the EPG data and reservation status information which relates to a reservation status of program recording;

carrying out reservation recording processing for recording a program in accordance with the reservation status information; and carrying out the direct communication with the communication apparatus over the communication network through the router using the port of the recording apparatus identified in the socket information of the access information without such communication being controlled by the server that controlled the initial registering of the recording apparatus and the subsequent logging in of the communication apparatus, including transmitting the EPG data or the reservation status information in accordance with a request from the external communication apparatus.

15. A communication apparatus for communicating over a communication network with an external recording apparatus which receives and records a program, the communication apparatus comprising:

a communication unit which receives user-inputted identification information that is inputted into the communication apparatus by a user, and which transmits to an external server a login request that includes the user-inputted identification information, the external recording apparatus having previously transmitted to the server identification information corresponding to the external recording apparatus to register the external recording apparatus with the server by which the server controls the initial registering of the recording apparatus and the subsequent logging in of the communication apparatus to enable communication thereafter between the recording apparatus and the communication apparatus through a router to be directly carried out without being controlled by the server;

the communication unit, in response to successfully logging in to the server, receiving access information from the server, the access information comprising socket information identifying a port of the recording apparatus to be used for the direct communication between the recording apparatus and the communication unit of the communication apparatus to be carried out over the communication network through the router without such communication being controlled by the server that controlled the initial registering of the recording apparatus and the subsequent logging in of the communication apparatus, the login request being successful upon the identification information included in the login request coinciding with the stored identification information previously transmitted by the recording apparatus, the access information being previously transmitted by the recording apparatus to the server in response to a request from the server for the access information, wherein the request comprises a port confirmation message for requesting confirmation of the port of the recording apparatus to use for direct communication between the recording apparatus and the communication apparatus;

in response to the recording apparatus receiving a program and EPG (Electronic Program Guide) data, storing the EPG data and reservation status information which relates to a reservation status of program recording, carrying out reservation recording processing in which a program is recorded in accordance with the reservation status information, and communicating over the communication network through the router using the port of the recording apparatus identified in the socket information of the access information and transmitting the EPG data or the reservation status information to the communication apparatus in accordance with a request from the communication apparatus, registering of the recording apparatus and the subsequent logging in of the communication apparatus, including transmitting a request of the EPG data or the reservation status information in accordance with an operation of a user, and receiving the EPG data or the reservation status information transmitted from the recording apparatus over the communication network in accordance with the request; and a presenting unit which presents the EPG data or the reservation status information received by the communication unit.

16. The communication apparatus as set forth in claim 15, wherein the communication unit further transmits a reservation request for requesting reservation of program recording in accordance with an operation of a user, and the recording apparatus further carries out recording reservation processing for reserving program recording in accordance with the reservation request.

17. The communication apparatus as set forth in claim 15, wherein the communication unit further transmits an editing request for requesting editing of the reservation status information in accordance with an operation of a user, and the recording apparatus further edits the reservation status information in accordance with the editing request.

18. The communication apparatus as set forth in claim 16, wherein the communication unit further receives overlap information which is transmitted in case that it was judged in the recording apparatus that the reservation requested program overlaps with a program already reserved for recording, and the presenting unit presents the overlap information received by the communication unit.

19. In a communication apparatus, a method of communicating over a communication network with an external recording apparatus which receives and records a program, the method comprising:

receiving user-inputted identification information that is inputted into the communication apparatus by a user;

transmitting to an external server a login request that includes the user-inputted identification information, the external recording apparatus having previously transmitted to the server identification information corresponding to the external recording apparatus to register the external recording apparatus with the server by which the server controls initial registering of the recording apparatus and the subsequent logging in of the communication apparatus to enable communication thereafter between the recording apparatus and the communication apparatus through a router to be directly carried out without being controlled by the server;

in response to successfully logging in to the server, receiving access information from the server, the access information comprising socket information identifying a port of the recording apparatus to be used for the direct communication between the recording apparatus and the communication unit of the communication apparatus to be carried out over the communication network through the router without such communication being controlled by the server that controlled the initial communication between the recording apparatus and the communication apparatus, the login request being successful upon the identification information included in the login request coinciding with the stored identification information previously transmitted by the recording apparatus, the access information being previously transmitted by the recording apparatus to the server in response to a request from the server for the access information, wherein the request comprises a port confirmation message for requesting confirmation of the port of the recording apparatus to use for direct communication between the recording apparatus and the communication apparatus; and in response to the recording apparatus receiving a program and EPG (Electronic Program Guide) data, storing the EPG data and reservation status information which relates to a reservation status of program recording, carrying out reservation recording processing in which a program is recorded in accordance with the reservation status information, and communicating over the communication network through the router using the port of the recording apparatus identified in the socket information of the access information and transmitting the EPG data or the reservation status information to the communication apparatus in accordance with a request from the communication apparatus, carrying out the direct communication with the recording apparatus over the communication network through the router using the port of the recording apparatus identified in the socket information of the access information without such communication being controlled by the server that controlled the initial registering of the recording apparatus and the subsequent logging in of the communication apparatus, including transmitting a request of the EPG data or the reservation status information in accordance with an operation of a user and receiving the EPG data or the reservation status information transmitted from the recording apparatus over the communication network in accordance with the request, and presenting the EPG data or the reservation status information received in the communication step.

20. A non-transitory recording medium having recorded thereon a computer-readable program for performing a method of controlling a communication apparatus which communicates over a communication network with an external recording apparatus for receiving and recording a program, the method including:

receiving user inputted identification information that is inputted into the communication apparatus by a user;

transmitting to an external server a login request that includes the user-inputted identification information, the external recording apparatus having previously transmitted to the server identification information corresponding to the external recording apparatus to register the external recording apparatus with the server by which the server controls initial registering of the recording apparatus and the subsequent logging in of the communication apparatus to enable communication thereafter between the recording apparatus and the communication apparatus trough a router to be directly carried out without being controlled by the server;

in response to successfully logging in to the server, receiving access information from the server, the access information comprising socket information identifying a port of the recording apparatus to be used for the direct communication between the recording apparatus and the communication unit of the communication apparatus to be carried out over the communication network through the router without such communication being controlled by the server that controlled the initial communication between the recording apparatus and the communication apparatus, the login request being successful upon the identification information included in the login request coinciding with the stored identification information previously transmitted by the recording apparatus, the access information being previously transmitted by the recording apparatus to the server in response to a request from the server for the access information, wherein the request comprises a port confirmation message for requesting confirmation of the port of the recording apparatus to use for direct communication between the recording apparatus and the communication apparatus; and in response to the recording apparatus receiving a program and EPG (Electronic Program Guide) data, storing the EPG data and reservation status information which relates to a reservation status of program recording, carrying out reservation recording processing in which a program is recorded in accordance with the reservation status information, and communicating over the communication network through the router using the port of the recording apparatus identified in the socket information of the access information and transmitting the EPG data or the reservation status information to the communication apparatus in accordance with a request from the communication apparatus, carrying out the direct communication with the recording apparatus over the communication network through the router using the port of the recording apparatus identified in the socket information of the access information without such communication being controlled by the server that controlled the initial registering of the recording apparatus and the subsequent logging in of the communication apparatus, including transmitting a request of the EPG data or the reservation status information in accordance with an operation of a user and receiving the EPG data or the reservation status information transmitted from the recording apparatus over the communication network in accordance with the request, and presenting the EPG data or the reservation status information received in the communication step.

* * * * *